(12) United States Patent
Tsurumi

(10) Patent No.: US 9,552,653 B2
(45) Date of Patent: Jan. 24, 2017

(54) INFORMATION PROCESSING APPARATUS, INFORMATION PROCESSING METHOD, AND STORAGE MEDIUM

(71) Applicant: Sony Corporation, Minato-ku (JP)

(72) Inventor: Shingo Tsurumi, Saitama (JP)

(73) Assignee: SONY CORPORATION, Tokyo (JP)

( * ) Notice: Subject to any disclaimer, the term of this patent is extended or adjusted under 35 U.S.C. 154(b) by 234 days.

(21) Appl. No.: 14/169,622

(22) Filed: Jan. 31, 2014

(65) Prior Publication Data

US 2014/0292810 A1 Oct. 2, 2014

(30) Foreign Application Priority Data

Mar. 28, 2013 (JP) ................... 2013-068038

(51) Int. Cl.
G09G 5/00 (2006.01)
G06T 11/00 (2006.01)

(52) U.S. Cl.
CPC ...................................... G06T 11/00 (2013.01)

(58) Field of Classification Search
USPC .......................................................... 345/633
See application file for complete search history.

(56) References Cited

U.S. PATENT DOCUMENTS

| | | | | |
|---|---|---|---|---|
| 6,290,648 B1* | 9/2001 | Kamiyama | ........ | A61B 8/4245 128/916 |
| 7,391,409 B2* | 6/2008 | Zalewski | ............... | G06F 3/017 345/156 |
| 7,991,220 B2* | 8/2011 | Nagai | ................. | A63F 3/00643 345/633 |
| 8,797,260 B2* | 8/2014 | Mao | ....................... | A63F 13/06 345/156 |
| 2003/0078326 A1* | 4/2003 | Zhao | ..................... | C08K 5/005 524/205 |
| 2006/0007308 A1* | 1/2006 | Ide | ......................... | G01S 3/7864 348/143 |
| 2007/0078326 A1* | 4/2007 | Yoshikawa | ............ | A61B 8/08 600/407 |
| 2008/0064498 A1* | 3/2008 | Okamura | ............... | A63F 13/00 463/34 |
| 2010/0328319 A1* | 12/2010 | Ikenoue | ................ | A63F 13/06 345/474 |
| 2011/0306420 A1* | 12/2011 | Nishimoto | ............ | A63F 13/06 463/36 |
| 2012/0020516 A1* | 1/2012 | Lee | .................... | G06K 9/00771 382/103 |
| 2012/0154661 A1* | 6/2012 | Shimada | ............... | G03B 21/14 348/333.1 |
| 2013/0169537 A1 | 7/2013 | Tsurumi et al. | | |
| 2014/0082526 A1* | 3/2014 | Park | ..................... | H04L 65/403 715/757 |

FOREIGN PATENT DOCUMENTS

JP 3841806 11/2006

OTHER PUBLICATIONS

U.S. Appl. No. 14/519,478, filed Oct. 21, 2014, Tsurumi, et al.

* cited by examiner

*Primary Examiner* — Ryan R Yang

(74) *Attorney, Agent, or Firm* — Oblon, McClelland, Maier & Neustadt, L.L.P.

(57) ABSTRACT

There is provided an information processing apparatus including an acquisition unit configured to acquire a motion state of a real object, and a display control unit configured to display a virtual object according to the acquired motion state.

15 Claims, 23 Drawing Sheets

INFORMATION PROCESSING APPARATUS, INFORMATION PROCESSING METHOD, AND STORAGE MEDIUM

CROSS REFERENCE TO RELATED APPLICATIONS

This application claims the benefit of Japanese Priority Patent Application JP 2013-068038 filed Mar. 28, 2013, the entire contents of which are incorporated herein by reference.

BACKGROUND

The present disclosure relates to an information processing apparatus, an information processing method, and a storage medium.

In recent years, advancement of an image recognition technology makes it possible to recognize a position and a posture of a real object (for example, an object such as a signboard or a building) included in an image inputted from an imaging apparatus. A technology called AR (Augmented Reality) is known as an application example of such object recognition.

By using the AR technology, a virtual object associated with a real object (for example, advertisement information, navigation information, or information for a game) included in an image of a real space can be added to the real object. An example of such an AR technology is disclosed in JP 3841806B.

SUMMARY

Nevertheless, when a virtual object is displayed in a fixed state regardless of a motion state of a real object, it might be difficult to intuitively know the motion state of the real object.

Hence, it is desirable to display the virtual object so that the motion state of the real object can be intuitively known.

According to the embodiments of the present disclosure, there is provided an information processing apparatus including an acquisition unit configured to acquire a motion state of a real object, and a display control unit configured to display a virtual object according to the acquired motion state.

According to the embodiments of the present disclosure, there is provided an information processing method including acquiring a motion state of a real object, and displaying a virtual object according to the acquired motion state.

According to the embodiments of the present disclosure, there is provided a non-transitory computer-readable storage medium having a program stored therein, the program causing a computer to execute: acquiring a motion state of a real object, and displaying a virtual object according to the acquired motion state.

According to the embodiments of the present disclosure described above, there are provided an information processing apparatus, an information processing method, and a storage medium which can display a virtual object so that a motion state of a real object can be intuitively known.

DETAILED DESCRIPTION OF THE EMBODIMENTS

Figure 1:
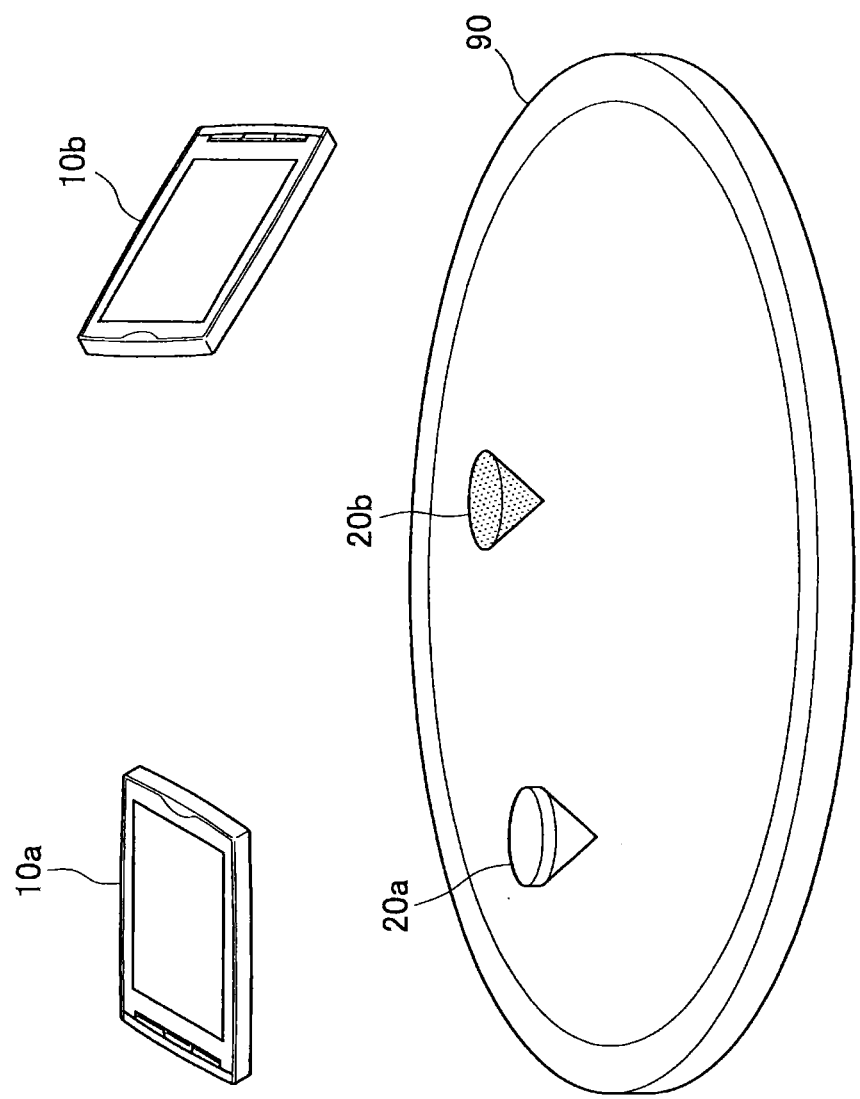
FIG. 1 is a diagram for explaining an outline of an information processing apparatus according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the descriptions will be given in the following order.

1. First Embodiment
   1.1. Outline
   1.2. Configuration
   1.3. Processing
   1.4. Modification
   1.5. Conclusion
2. Second Embodiment
   2.1. Outline
   2.2. Configuration
   2.3. Processing
   2.4. Conclusion
3. Third Embodiment
   3.1. Outline
   3.2. Configuration
   3.3. Processing
   3.4. Conclusion
4. Hardware Configuration Example

1. First Embodiment

1.1. Outline

An outline of information processing apparatuses 10 according to a first embodiment of the present disclosure will be described with reference to FIGS. 1 and 2. Firstly, reference is made to FIG. 1. FIG. 1 is a diagram for explaining the outline of each information processing apparatus 10 according to the first embodiment of the present disclosure, and illustrates an example where the information processing apparatus 10 is applied to a top spinning game.

In the example of the game illustrated in FIG. 1, a plurality of users spin their respective tops 20 which are real objects on a stage 90 which is a real object, and compete with each other for a longer spinning duration between the tops 20 of the users without being flicked away from the stage 90. Each user spins the corresponding top 20 on the stage 90, and observes a movement of the top 20 by using the corresponding information processing apparatus 10 including an imaging unit 101 and a display unit 109. Specifically, examples of the information processing apparatus 10 include a smartphone, a mobile phone, a PDA (Personal Digital Assistant), and a mobile game machine.

Hereinafter, a top 20a and an information processing apparatus 10a are respectively equivalent to the top 20 and the information processing apparatus 10 of a user Ua. Likewise, a top 20b and an information processing apparatus 10b are respectively equivalent to the top 20 and the information processing apparatus 10 of a user Ub. When being not particularly discriminated from each other, the tops 20a and 20b are each simply referred to as the "top 20". Likewise, when being not particularly discriminated from each other, the information processing apparatuses 10a and 10b are each simply referred to as the "information processing apparatus 10".

The information processing apparatus 10 detects each top 20 from an image captured by the imaging unit 101 (hereinafter referred to as a "captured image") and calculates a motion state of the top 20 based on the captured image. The information processing apparatus 10 displays a virtual object in such a manner as to superimpose the virtual object on the top 20 in the captured image according to the calculated motion state. Note that a mechanism by which the information processing apparatus 10 recognizes the stage 90 and the tops 20a and 20b will be described separately later together with a configuration of the information processing apparatus 10.

Figure 2:
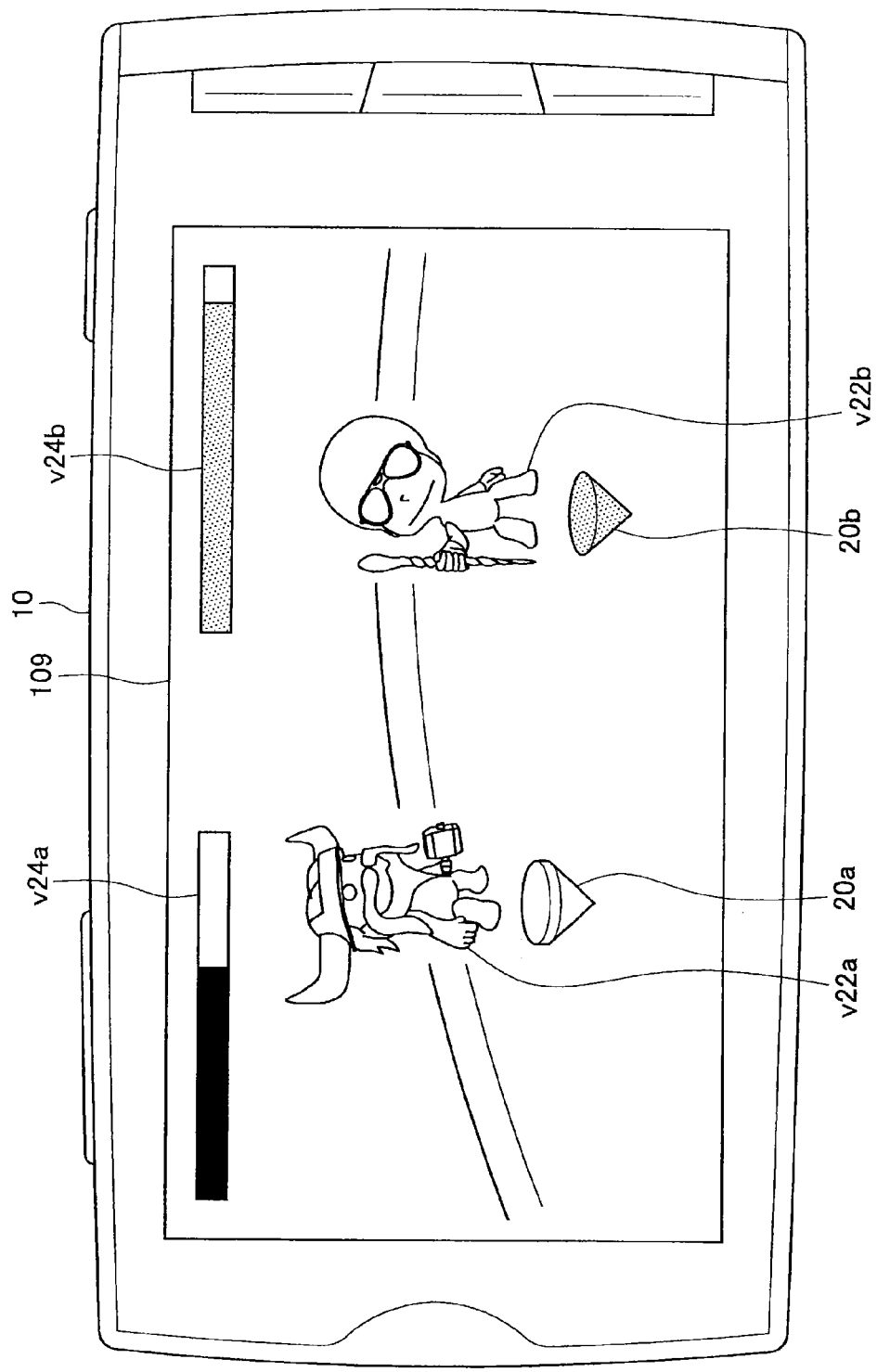
FIG. 2 is a diagram illustrating an example of a screen of the information processing apparatus according to the embodiment.

Here, reference is made to FIG. 2. FIG. 2 is a diagram illustrating an example of a screen of the information processing apparatus 10 according to the present embodiment. In the example in FIG. 2, the information processing apparatus 10 displays a virtual object v22a taking the form of a predetermined character, in association with the top 20a in the captured image. Likewise, the information processing apparatus 10 displays a virtual object v22b taking the form of a predetermined character, in association with the top 20b in the captured image.

In addition, the information processing apparatus 10 calculates a rotational speed as the motion state of each of the tops 20a and 20b, and displays virtual objects v24a and v24b, with the rotational speeds of the tops 20a and 20b being likened to life points of the virtual objects v22a and v22b, respectively. Specifically, the information processing apparatus 10 displays the virtual object v24a in the following manner. When the rotational speed of the top 20a is decreased due to air resistance or conflict with the stage 90, the life points of the top 20a decrease with the decrease of the rotational speed. At this time, the information processing apparatus 10 may control the display of the virtual object v22a in such a manner that the character shown as the virtual object v22a gets tired with the decrease of the rotational speed of the top 20a.

The information processing apparatus 10 may also infer subsequent movements of the tops 20a and 20b based on the motion states of the tops 20a and 20b and may change the display of the virtual objects associated with the tops 20a and 20b according to the inference results. In a specific example, the information processing apparatus 10 may control the display in the following manner. When it is inferred that the tops 20a and 20b approach or collide with each other, the virtual objects v22a and v22b taking the forms of the characters each assume a posture of defense against the collision.

As described above, the information processing apparatus 10 according to the present embodiment acquires the motion states of the real objects changing according to a physical law, and changes the display of the virtual objects according to the acquired motion states. This enables the users to intuitively know the motion states of the real objects. The details of the information processing apparatus 10 according to the present embodiment will be described below.

1.2. Configuration

Figure 3:
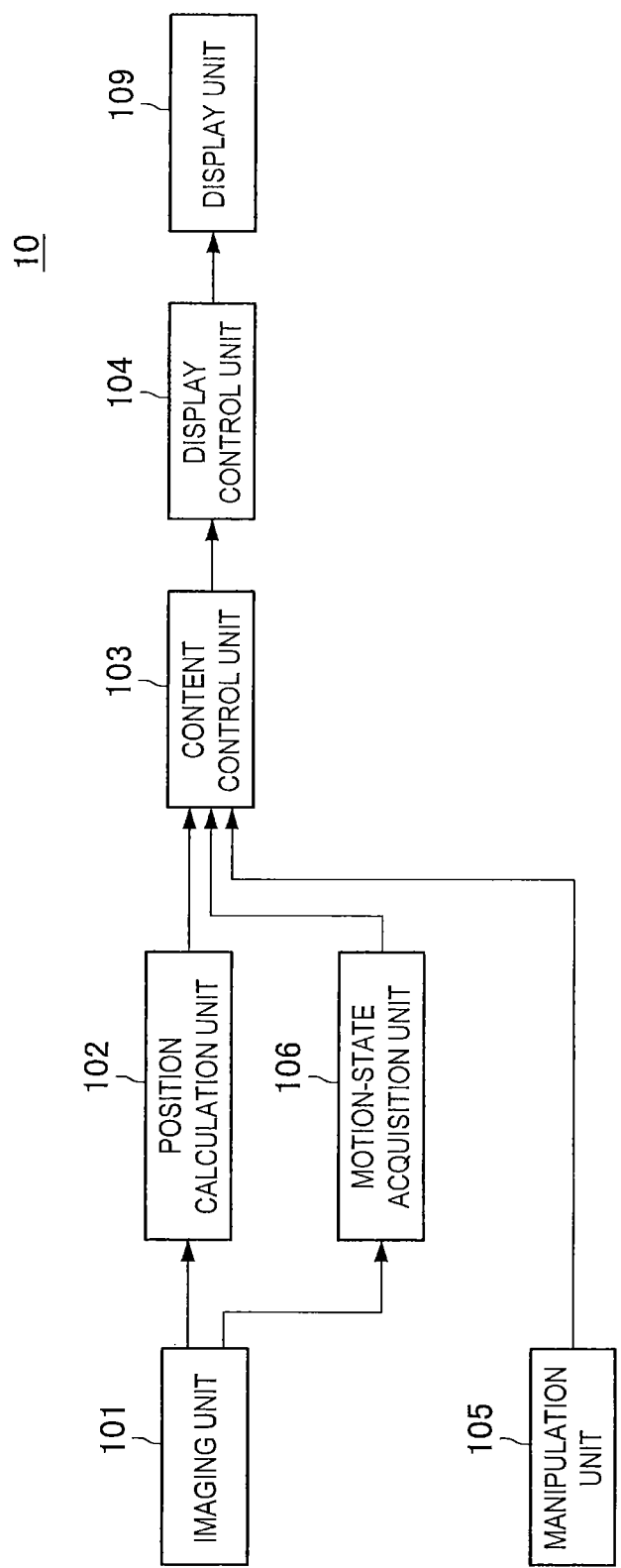
FIG. 3 is a block diagram illustrating a configuration of the information processing apparatus according to the embodiment.

The configuration of the information processing apparatus 10 according to the present embodiment will be described with reference to FIG. 3. FIG. 3 is a block diagram illustrating an example of the configuration of the information processing apparatus 10 according to the present embodiment. Note that components of the information processing apparatus 10 will be described below by taking an example as a case where in the top spinning game illustrated in FIGS.

1 and 2, each top 20 which is the real object is detected in the captured image and where the virtual object is displayed in such a manner as to be superimposed on the detected top 20.

As illustrated in FIG. 3, the information processing apparatus 10 according to the present embodiment includes the imaging unit 101, a position calculation unit 102, a content control unit 103, a display control unit 104, a manipulation unit 105, a motion-state acquisition unit 106, and the display unit 109.

The imaging unit 101 captures an image every predetermined frames. The imaging unit 101 sequentially outputs the captured images to the position calculation unit 102 and the motion-state acquisition unit 106.

The position calculation unit 102 acquires the captured images sequentially from the imaging unit 101. The position calculation unit 102 detects each top 20 which is the real object in each captured image acquired from the imaging unit 101. Specifically, the top 20 is provided in advance with a marker. The position calculation unit 102 detects the marker provided on the top 20 and thereby can recognize a position and a posture of the top 20. Note that in this specification, the term "marker" generally means a certain object having a known pattern and existing in the real space. In other words, the marker can include: a real object; part of the real object; a figure, a symbol, a character string, or a pattern each of which is shown on a surface of the real object; an image displayed on a display; and the like. Although there is a case where the term "marker" in a narrow sense means a special object prepared for a certain application, the technology according to an embodiment of the present disclosure is not limited to such a case. The following summarizes a specific example of a method by which the position calculation unit 102 detects the top 20.

The position calculation unit 102 recognizes the marker included in the captured image, by collating a feature amount determined based on the captured image acquired from the imaging unit 101 with a feature amount stored in advance for each real object which is a detection target.

More specifically, the position calculation unit 102 determines a feature amount of the real object in the captured image in accordance with a feature amount determination method such as the SIFT (Scale-Invariant Feature Transform) method or the Random Ferns method, and collates the determined feature amount with the feature amount of the real object. Then, the position calculation unit 102 recognizes: information (a marker code) for identifying a marker associated with a feature amount best matching the feature amount of the real object in the captured image; and a position and a posture of the marker in the captured image.

Here, the position calculation unit 102 uses a feature amount dictionary including feature amount data of each real object and information for identifying the real object, but where to store the feature amount dictionary is not limited as long as the position calculation unit 102 can read the feature amount dictionary. The feature amount data of the real object may be, for example, a set of feature amounts determined from an image for learning the real object in accordance with the SIFT method or the Random Ferns method.

The position calculation unit 102 identifies a predetermined object serving as a reference (hereinafter, referred to as a "reference object") in the captured image and identifies a position (hereinafter, referred to as a "relative position") of each top 20 relative to the identified reference object. In a specific example, the position calculation unit 102 may use one of the tops 20 as the reference object based on detection results of the tops 20 and may identify a relative position of the other top 20. For example, the position calculation unit 102 uses the top 20a of the tops 20a and 20b as the reference object and thereby can identify the relative position of the top 20b relative to the top 20a.

The stage 90 may also be provided with a marker. In the case of providing the stage 90 with the marker, the position calculation unit 102 detects the marker on the stage 90 in the captured image and thereby may identify the position of the stage 90 based on the position of the detected marker. The position of the stage 90 is identified in this way, and thus the position calculation unit 102 may identify the positions of the tops 20a and 20b, for example, by using the stage 90 as the reference object.

The position calculation unit 102 sequentially outputs, to the content control unit 103, each captured image acquired from the imaging unit 101, the position information of the reference object, and the position information indicating the relative position of each top 20 relative to the reference object. The content control unit 103 can thereby recognize a relative positional relationship between the tops 20 by using the position information of the reference object as the reference.

The position calculation unit 102 may also calculate a scale for converting sizes of objects in the captured image into sizes in the real space and may notify the content control unit 103 of the scale. In a specific example, the position calculation unit 102 identifies an object of which size is known in the real space in the captured image, and measures the size of the identified object in the captured image. Examples of the object having the known size in the real space include the top 20 and the marker provided on the stage 90.

The position calculation unit 102 may calculate the scale for converting the sizes of the objects in the captured image into the sizes in the real space based on the size measurement results. As described above, the position calculation unit 102 calculates the scale and notifies the content control unit 103 of the scale, and thereby the content control unit 103 can calculate a distance between the tops 20 in the real space based on a distance between the tops 20 in the captured image and the notified scale.

The motion-state acquisition unit 106 sequentially acquires the captured images from the imaging unit 101. The motion-state acquisition unit 106 detects each target real object in each acquired captured image. Note that the motion-state acquisition unit 106 may detect the real object in the captured image by using the same method as used by the position calculation unit 102, or may obtain a detection result from the position calculation unit 102.

The motion-state acquisition unit 106 also calculates a motion state of each top 20 by performing an image analysis on the captured image acquired from the imaging unit 101. In a specific example, the motion-state acquisition unit 106 may calculate, as the motion state, a momentum, a momentum variation, or a motion-direction variation.

For example, the motion-state acquisition unit 106 may calculate the rotational speed of the top 20 based on the plurality of time-series captured images (a plurality of frames). Specifically, the marker for calculating the rotational speed is provided in advance to part of the top 20 in a rotating direction. The motion-state acquisition unit 106 performs the image analysis on the plurality of time-series captured images and thereby detects the marker for calculating the rotational speed in each captured image. The motion-state acquisition unit 106 may count the markers detected in the plurality of images, and may calculate the rotational speed of the top 20 based on a ratio between the number of the captured images and the counted number of markers. Note that the method described above is an example, and the method is not limited as long as the rotational speed of the top 20 can be calculated based on the captured images acquired from the imaging unit 101.

The motion-state acquisition unit 106 may also calculate the translation speed of the top 20 based on the plurality of time-series captured images (plurality of frames). Specifically, the motion-state acquisition unit 106 performs the image analysis on the plurality of time-series captured images and measures a position variation of the top 20 in the captured images. The motion-state acquisition unit 106 may calculate the translation speed of the top 20 based on the measured position variation of the top 20. At this time, the calculated translation speed does not necessarily have to be a speed having an absolute value in the real space. For example, the motion-state acquisition unit 106 may calculate a relative translation speed based on the size of the top 20 in the captured images. Note that the motion-state acquisition unit 106 may calculate, as an absolute value, the speed of the top 20 in the real space, based on the size of an object, such as the top 20, in the captured images the size of which is known in the real space. The method described above is an example, and the method is not limited as long as the translation speed of the top 20 can be calculated based on the captured images acquired from the imaging unit 101.

The motion-state acquisition unit 106 may also calculate a motion direction of the top 20 based on the plurality of time-series captured images (plurality of frames). Specifically, the motion-state acquisition unit 106 may identify a changing direction of the position of the top 20 in the captured images by performing the image analysis on the plurality of time-series captured images.

The motion-state acquisition unit 106 calculates the motion state of each top 20 every predetermined timing (in real time) and notifies the content control unit 103 of information indicating the calculated motion state (for example, the rotational speed, the translation speed, or the motion direction) of the top 20.

Note that the motion state described above is an example, and the type of or a calculation method for the motion state of the real object is not limited as long as a variation of the motion state can be calculated, the motion state being a momentum, a momentum variation, or a motion direction variation. In the description of the example in FIG. 3, the position calculation unit 102 and the motion-state acquisition unit 106 are separate components, but the position calculation unit 102 and the motion-state acquisition unit 106 may be put together into one component.

The content control unit 103 generates virtual objects to be associated with the respective tops 20, based on the positions and the motion states of the tops 20 notified from the position calculation unit 102 and the motion-state acquisition unit 106. The following describes the details of the content control unit 103.

The content control unit 103 sequentially acquires from the position calculation unit 102: the images captured by the imaging unit 101; the position information of the reference object; and the position information indicating the relative position of each top 20 relative to the reference object. In a specific example, the content control unit 103 uses one of the tops 20 as the reference object and thereby acquires the position information indicating the relative position of the other top 20 relative to the top 20 which is the reference object. In another example, the content control unit 103 may use as the reference object the marker provided on a real object such as the stage 90 which is other than the tops 20 and thereby may acquire, from the position calculation unit 102, the position information indicating the relative position of each top 20 relative to the marker which is the reference object.

The content control unit 103 identifies the position of each top 20 in each acquired captured image and a relative positional relationship (that is, a direction or a distance) between the tops 20, based on the position information of the reference object and the position information indicating the relative position of each top 20 relative to the reference object.

Note that the content control unit 103 may acquire, from the position calculation unit 102, information indicating the scale for converting sizes of objects in each captured image into sizes in the real space. In this case, the content control unit 103 may convert a distance between the tops 20 in the captured image into a distance in the real space based on the position information indicating the relative positions of the tops 20 and based on the acquired scale.

The content control unit 103 also acquires information indicating the motion state (for example, the rotational speed, the translation speed, and the moving direction) of each top 20, from the motion-state acquisition unit 106.

The content control unit 103 generates virtual objects corresponding to the tops 20, and identifies the display position and a display mode of each generated virtual object based on the position and the motion state of the corresponding top 20. An example of processing by which the content control unit 103 identifies the display position and the display mode of the virtual object will be described with reference to FIG. 2.

For example, the content control unit 103 determines the display positions of the virtual objects v22a and v22b corresponding to the tops 20a and 20b, respectively, based on the positions of the tops 20a and 20b in the captured image.

The content control unit 103 also calculates an orientation of the top 20b with respect to the top 20a based on the position information indicating the relative positions of the tops 20a and 20b. The content control unit 103 adjusts the orientation of the virtual object v22a so that the character represented by the virtual object v22a can face the calculated direction, that is, faces the top 20b. The same holds true for the virtual object v22b. Note that the logic described above is an example, and the logic for identifying the orientation of the virtual object v22a is not limited to that described above. For example, if two or more tops 20 exist other than the top 20a, the content control unit 103 may adjust the orientation of the virtual object v22a so that the virtual object v22a can face one of the tops 20 which is closest to the top 20a.

In the example in FIG. 2, the game goes on, with the rotational speeds of the tops 20 being likened to the life points of the tops 20. For this reason, the content control unit 103 calculates the life points of the top 20a based on the rotational speed of the top 20a, and generates the virtual object v24a visualizing the life points based on a calculation result. Likewise, the content control unit 103 generates the virtual object v24b based on the rotational speed of the top 20b. Note that the content control unit 103 may determine the positions of the generated virtual objects v24a and v24b in the captured image as predetermined positions or may determine the positions based on the positions of the virtual objects v22a and v22b.

The content control unit 103 may also change the display mode of the virtual objects v22a and v22b according to the calculated life points. For example, the content control unit 103 may control the display of the virtual object v22a in such a manner that the character represented by the virtual object v22a gets tired with the decrease of the life points calculated based on the rotational speed of the top 20a.

The content control unit 103 may also change the display mode of the virtual object in accordance with the relative positional relationship between the tops 20a and 20b. In a specific example, the content control unit 103 may change the display mode of the virtual objects v22a and v22b according to a distance between the tops 20a and 20b. For example, when the distance between the tops 20a and 20b becomes equal to or lower than a threshold, the content control unit 103 may change the display mode of the virtual objects v22a and v22b in such a manner that the characters represented by the virtual objects v22a and v22b assume postures of defense.

Figure 4:
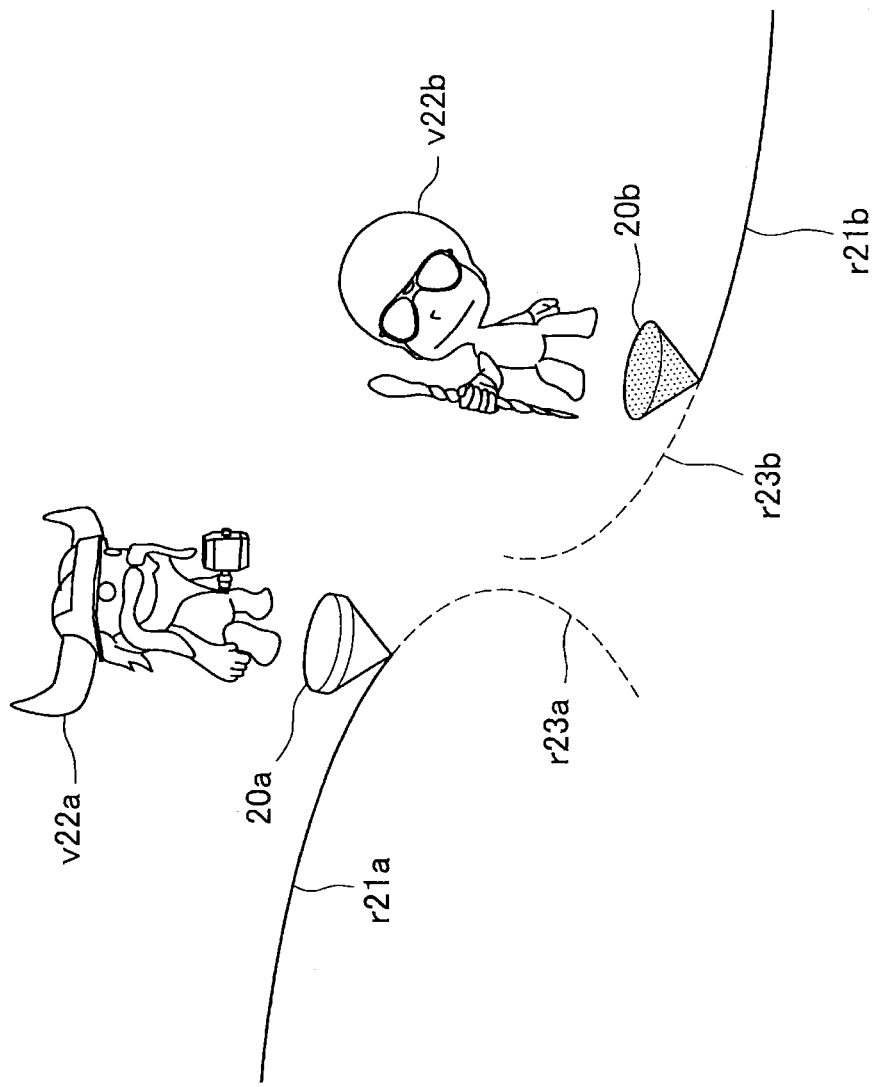
FIG. 4 is a diagram for explaining processing related to inference of a motion state in the information processing apparatus according to the embodiment.

The content control unit 103 may also infer a movement of each top 20 based on the position and the motion state of the top 20 and may control the display of the corresponding virtual object based on the inference result. For example, FIG. 4 is a diagram for explaining processing related to the motion state inference performed by the content control unit 103, and illustrates an example of inferring trajectories of movements of the tops 20a and 20b and thereby changing the display mode of the virtual objects v22a and v22b according to the inference results.

For example, the content control unit 103 calculates a trajectory r21a of the top 20a moving until certain timing, based on change of information until the certain timing, the information indicating the position, the translation speed, and the motion direction of the top 20a. The content control unit 103 may calculate a subsequent trajectory r23a of the top 20a based on the calculated trajectory r21a and the position, the translation speed, and the motion direction of the top 20a which are effective at the timing. In a specific example, the content control unit 103 may infer a circular movement or a straight trajectory of the top 20a, based on the position, the translation speed, and the motion direction of the top 20a and thereby may calculate a subsequent trajectory (that is, the trajectory r23a) based on the inference result. Likewise, the content control unit 103 calculates a trajectory r21b of the top 20b moving until certain timing, based on change of information indicating the position, the translation speed, and the motion direction of the top 20b. The content control unit 103 may calculate a subsequent trajectory r23b of the top 20b based on the calculated trajectory r21b and the position, the translation speed, and the motion direction of the top 20b which are effective at the timing.

The content control unit 103 infers whether the tops 20a and 20b are going to collide with each other, based on the calculated trajectories r23a and r23b. When inferring that the tops 20a and 20b are to collide with each other, the content control unit 103 may change the display mode of the virtual objects v22a and v22b so that the characters represented by the virtual objects v22a and v22b can assume postures of offense. The content control unit 103 may also change the display mode of the virtual objects v22a and v22b depending on whether the tops 20a and 20b have consequently collided with each other. For example, when the tops 20a and 20b do not consequently collide with each other, the content control unit 103 may change the display mode of the virtual objects v22a and v22b to see failures of offence of the characters represented by the virtual objects v22a and v22b.

As described above, the content control unit 103 may infer a future movement of each top 20 based on the position and the motion state of the top 20 and control the display of the corresponding virtual object based on the inference result.

The content control unit 103 outputs each captured image acquired from the position calculation unit 102 and control information of the generated virtual object, to the display control unit 104. Note that the control information includes display information for displaying the virtual object as an image in the captured image and information indicating the position where the virtual object is to be displayed.

The display control unit 104 acquires the captured image and the control information for the virtual object from the content control unit 103. The display control unit 104 displays the virtual object in the captured image in a superimposed manner based on the acquired control information. The display control unit 104 displays the captured image including the virtual object displayed in the superimposed manner on the display unit 109. The display unit 109 is a display module including an LCD (Liquid Crystal Display), an OLED (Organic light-Emitting Diode), and the like.

The manipulation unit 105 is an input module for manipulating the information processing apparatus 10 and includes a touch panel, buttons, and the like. The manipulation unit 105 notifies the content control unit 103 of control information indicating the content of input manipulation by the user. The content control unit 103 recognizes the content of the input manipulation by the user based on the control information notified by the manipulation unit 105. Thereby, the content control unit 103 may switch starting and terminating of processing related to, for example, virtual object generation or display control, based on the control information from the manipulation unit 105. Such a configuration enables the information processing apparatus 10 to control, for example, the start and termination of the game according to the input manipulation of the manipulation unit 105.

Note that the content control unit 103 may appropriately change virtual content to be displayed in the superimposed manner in the captured image, depending on the type of the user who manipulates the information processing apparatus 10. In a specific example, the content control unit 103 may appropriately change the virtual content to be displayed in the superimposed manner in the captured image, depending on whether the user manipulating the information processing apparatus 10 is one of the players of the game. In this case, when the user is one of the players of the game, the content control unit 103 may display detail information for a real object corresponding to the user (for example, information indicating the motion state) and does not have to display detail information for the other real objects. When the user is not the player of the game, the content control unit 103 may display detail information for all of the real objects. Note that whether the user manipulating the information processing apparatus 10 is the player of the game may be designated, for example, by using the manipulation unit 105 before the start of the game.

The example of controlling the display of the virtual objects based on the rotational speeds of the tops has heretofore been described by using the example of the top spinning game. However, the controlling of the display of the virtual objects is not limited to the aforementioned example, as long as the display of the virtual objects can be controlled based on the motion states of the real objects. For example, FIG. 5 is a diagram illustrating an example of a screen of the information processing apparatus 10 and illustrates an example where a yo-yo 20 is a real object.

Figure 5:
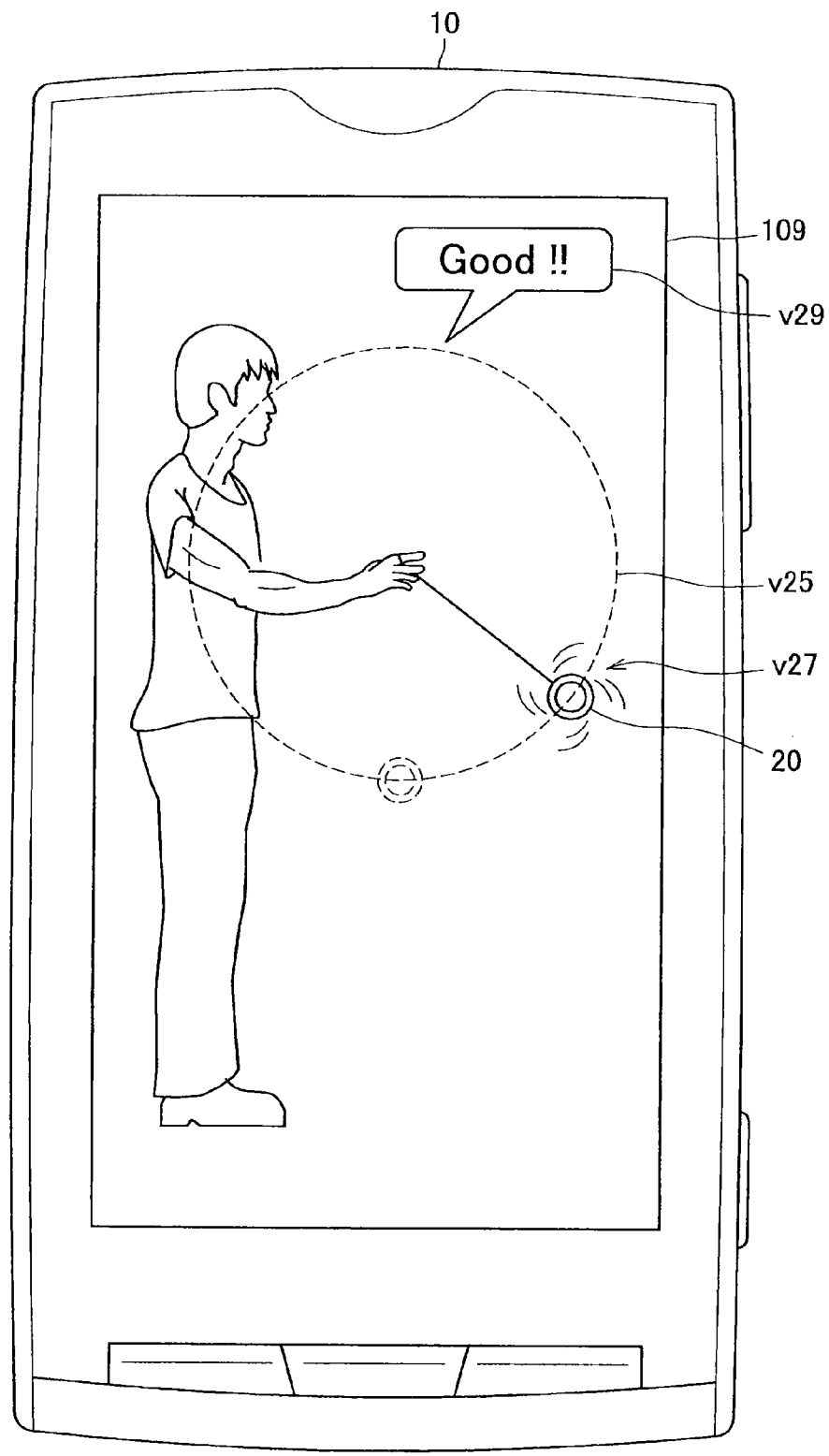
FIG. 5 is a diagram illustrating an example of a screen of the information processing apparatus according to the embodiment.

As illustrated in FIG. 5, when the information processing apparatus 10 according to the present embodiment is applied to a yo-yo, for example, the information processing apparatus 10 may recognize a yo-yo trick as a pattern of movement of the yo-yo 20 which is the real object, that is, as change of the position and the moving direction of the yo-yo 20. The information processing apparatus 10 may display a trajectory of the yo-yo 20 as a virtual object v25 on the display unit 109 in accordance with the yo-yo trick. The information processing apparatus 10 may acquire change of the position and the moving direction of the yo-yo 20 as the motion state and then display, in the superimposed manner, a virtual object v27 which emphasizes the movement of the yo-yo 20 in accordance with the acquired change of the position and the moving direction of the yo-yo 20. The information processing apparatus 10 may also determine whether execution of a predetermined yo-yo trick succeeds, based on the change of the position and the moving direction of the yo-yo 20, and may display a virtual object v29 based on the determination result in such a manner that whether the trick succeeds is identified.

1.3. Processing

Figure 6:
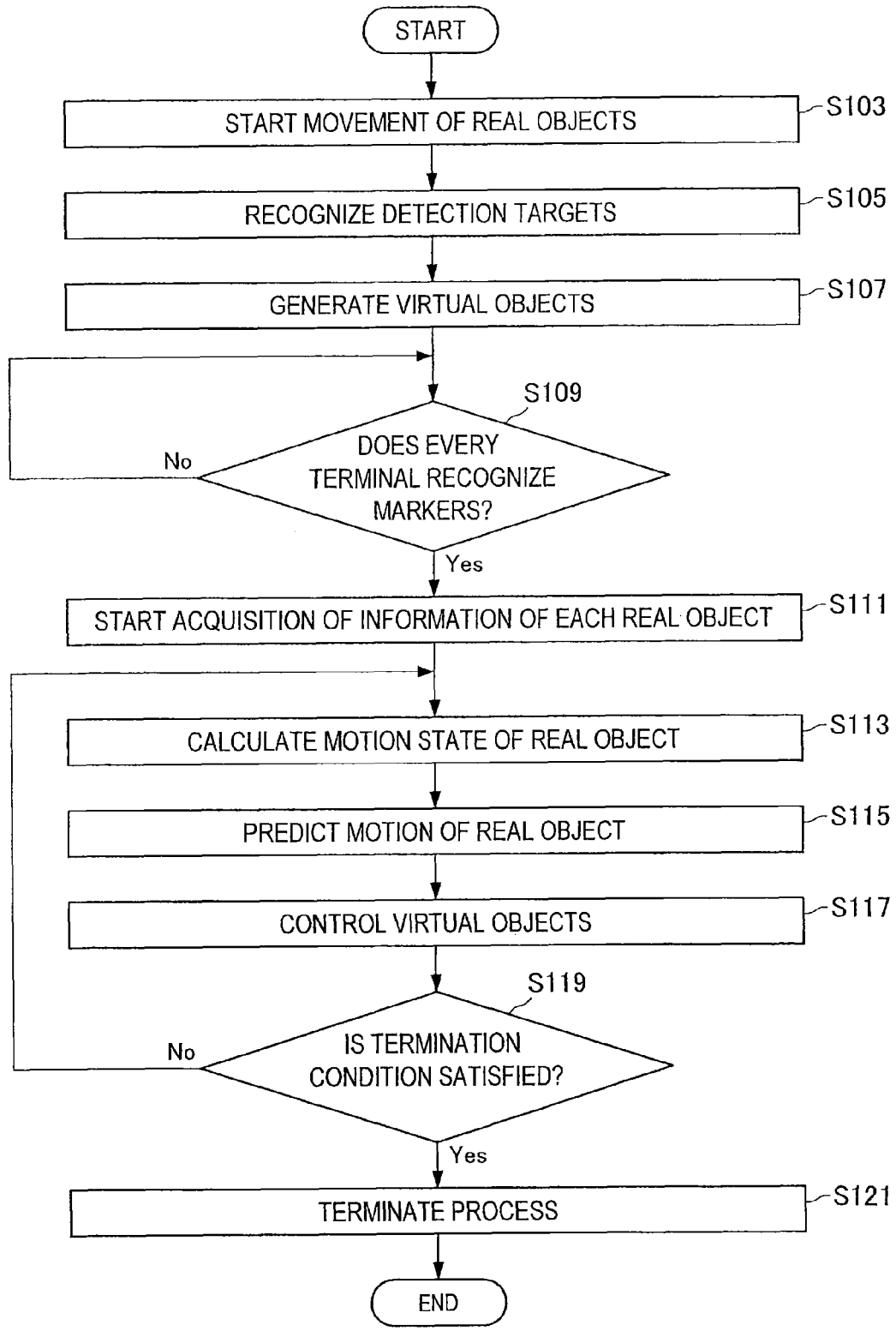
FIG. 6 is a flowchart illustrating an example of a series of operations of the information processing apparatus according to the embodiment.

With reference to FIG. 6, a series of operations of the information processing apparatus according to the present embodiment will be described by taking as an example the top spinning game illustrated in FIGS. 1 and 2. FIG. 6 is a flowchart illustrating an example of a series of operations of the information processing apparatus according to the present embodiment.

(Step S103)

When the users spin the respective real-object tops 20 on the stage 90, the real-object tops 20 each start a movement.

(Step S105)

Next, when each user starts observation of the tops 20 and the stage 90 by using the corresponding information processing apparatus 10 including the imaging unit 101 and the display unit 109, the position calculation unit 102 acquires captured images from the imaging unit 101. The position calculation unit 102 recognizes the position and the posture of each top 20 by detecting the marker provided on the top 20 in each captured image acquired from the imaging unit 101.

The position calculation unit 102 identifies a predetermined reference object in the captured image, and identifies a relative position of the top 20 relative to the identified reference object. For example, the position calculation unit 102 detects, in the captured image, the marker on the stage 90 of which image is captured and thereby identifies the position of the stage 90 based on the position of the detected marker. The position calculation unit 102 identifies the position of each top 20 by using the identified stage 90 as the reference object.

The position calculation unit 102 sequentially outputs, to the content control unit 103, the captured image acquired from the imaging unit 101, the position information of the reference object, and the position information indicating the relative position of the top 20 relative to the reference object.

(Step S107)

The content control unit 103 acquires, from the position calculation unit 102, the image captured by the imaging unit 101, the position information of the reference object, and the position information indicating the relative position of the top 20 relative to the reference object.

Based on the position information of the reference object and the position information indicating the relative position of the top 20 relative to the reference object, the content control unit 103 identifies the position of the top 20 in the acquired captured image and the relative positional relationship (that is, the direction and the distance) between the tops 20.

The content control unit 103 outputs the captured image acquired from the position calculation unit 102 and control information for generated virtual objects, to the display control unit 104.

The display control unit 104 acquires the captured image and the control information for the virtual objects from the content control unit 103. The display control unit 104 displays the virtual objects in the captured image in the superimposed manner based on the acquired control information. This causes the real object tops 20 and the virtual objects corresponding to the tops 20 to be displayed on the display unit 109 of the information processing apparatus 10.

(Step S109)

In this way, the information processing apparatuses 10 of the respective users recognize the markers of the tops 20 and the stage 90 in the aforementioned manner (N in Step S109).

(Step S111)

After the information processing apparatus 10 of every user completes the recognition of the markers of the tops 20 and the stage 90 (Y in Step S109), the information processing apparatus 10 starts acquisition of a motion state of the top 20.

Specifically, the imaging unit 101 captures the image every predetermined frames. The imaging unit 101 outputs the captured images sequentially to the position calculation unit 102 and the motion-state acquisition unit 106.

(Step S113)

The position calculation unit 102 sequentially identifies the position information of the reference object and the relative position of each top 20 relative to the reference object based on the captured image acquired from the imaging unit 101. The position calculation unit 102 sequentially outputs, to the content control unit 103, the captured image, the position information of the identified reference object, and the position information indicating the relative position of the top 20 relative to the reference object.

The motion-state acquisition unit 106 sequentially acquires the captured image from the imaging unit 101. The motion-state acquisition unit 106 detects the detection-target real objects from the acquired captured image. Note that the motion-state acquisition unit 106 may detect each real object in the captured image by using the same method as used by the position calculation unit 102, or may obtain a detection result from the position calculation unit 102.

The motion-state acquisition unit 106 also calculates the motion state of the top 20 by performing an image analysis on the captured image acquired from the imaging unit 101.

For example, the motion-state acquisition unit 106 may calculate the rotational speed of the top 20 based on the plurality of time-series captured images (plurality of frames). Specifically, the motion-state acquisition unit 106 performs the image analysis on the plurality of time-series captured images and thereby detects the marker for calculating the rotational speed in each captured image. The motion-state acquisition unit 106 may count the markers detected in the plurality of images, and may calculate the rotational speed of the top 20 based on a ratio between the number of the captured images and the counted number of markers.

The motion-state acquisition unit 106 may also calculate the translation speed of the top 20 based on the plurality of time-series captured images (plurality of frames). Specifically, the motion-state acquisition unit 106 performs the image analysis on the plurality of time-series captured images and measures a position variation of the top 20 in the captured images. The motion-state acquisition unit 106 may calculate the translation speed of the top 20 based on the measured position variation of the top 20.

The motion-state acquisition unit 106 may also calculate a motion direction of the top 20 based on the plurality of time-series captured images (plurality of frames). Specifically, the motion-state acquisition unit 106 may identify a changing direction of the position of the top 20 in the captured images by performing the image analysis on the plurality of time-series captured images.

The motion-state acquisition unit 106 calculates the motion state of each top 20 every predetermined timing (in real time) and notifies the content control unit 103 of information indicating the calculated motion state (for example, the rotational speed, the translation speed, or the motion direction) of the top 20.

(Step S115)

The content control unit 103 sequentially acquires from the position calculation unit 102: the images captured by the imaging unit 101; the position information of the reference object; and the position information indicating the relative position of each top 20 relative to the reference object.

The content control unit 103 identifies the position of each top 20 in each acquired captured image and a relative positional relationship (that is, the direction or the distance) between the tops 20, based on the position information of the reference object and the position information indicating the relative position of each top 20 relative to the reference object.

The content control unit 103 also acquires the motion state (for example, the rotational speed, the translation speed, and the moving direction) of the top 20 from the motion-state acquisition unit 106.

The content control unit 103 infers a movement of each top 20 based on the position and the motion state of the top 20. For example, the content control unit 103 calculates the trajectory r21a of the top 20a moving until certain timing, based on change of information until the certain timing, the information indicating the position, the translation speed, and the motion direction of the top 20a. The content control unit 103 can calculate the subsequent trajectory r23a of the top 20a based on the calculated trajectory r21a and the position, the translation speed, and the motion direction of the top 20a which are effective at the timing.

(Step S117)

The content control unit 103 generates the virtual objects corresponding to the tops 20 and identifies the display position and the display mode of each generated virtual object based on the position and the motion state of the corresponding top 20. Here, reference is made to FIG. 2.

For example, the content control unit 103 determines the display positions of the virtual objects v22a and v22b corresponding to the tops 20a and 20b, respectively, based on the positions of the tops 20a and 20b in the captured image.

The content control unit 103 may also calculate an orientation of the top 20b with respect to the top 20a based on the position information indicating the relative positions of the tops 20a and 20b, and may adjust the orientations of the characters represented by the virtual objects v22a and v22b.

The content control unit 103 may calculate life points of the tops 20a and 20b based on the rotational speeds of the tops 20a and 20b, and may generate the virtual objects v24a and v24b visualizing the life points. The content control unit 103 may also change the display mode of the virtual objects v24a and v24b according to the calculated life points.

In addition, the content control unit 103 may also control the display of the virtual objects based on the inference results of the movements of the respective tops 20. For example, when inferring that the tops 20a and 20b are to collide with each other, the content control unit 103 may change the display mode of the virtual objects v22a and v22b so that the characters represented by the virtual objects v22a and v22b can assume postures of offense.

(Step S119)

The information processing apparatus 10 repeats the series of processes shown in Steps S113 to S117 until a predetermined condition for terminating the game is satisfied (N in Step S119).

(Step S121)

When the condition for terminating the game is satisfied (Y in Step S119), the information processing apparatus 10 stops the acquisition of the motion state of each top 20 to terminate the series of processes.

As described above, the information processing apparatus 10 according to the present embodiment calculates the motion state of the top 20 which is the real object based on the image captured by the imaging unit 101, and controls the display of the corresponding virtual object according to the calculated motion state. Such a configuration enables the information processing apparatus 10 according to the present embodiment to display the virtual object so that the motion state of the real object can be intuitively known.

1.4. Modification

Next, a description is given of the information processing apparatus 10 according to a modification of the first embodiment. The information processing apparatus 10 according to the aforementioned embodiment includes the motion-state acquisition unit 106 configured to calculate the motion state of each real object based on the image captured by the imaging unit 101, and controls the display of the virtual object according to the motion state calculated by the motion-state acquisition unit 106. In contrast, an information processing apparatus 12 according to the modification acquires a motion state of each real object 20 which is a detection target by using a sensor, and controls display of virtual objects according to the motion state acquired from the sensor. A description is given below of a configuration of the information processing apparatus 12 according to the modification with reference to FIGS. 7 and 8, focusing on part different from the embodiment described above. As for components operating in the same manner as in the embodiment described above, a detailed description is omitted.

Figure 7:
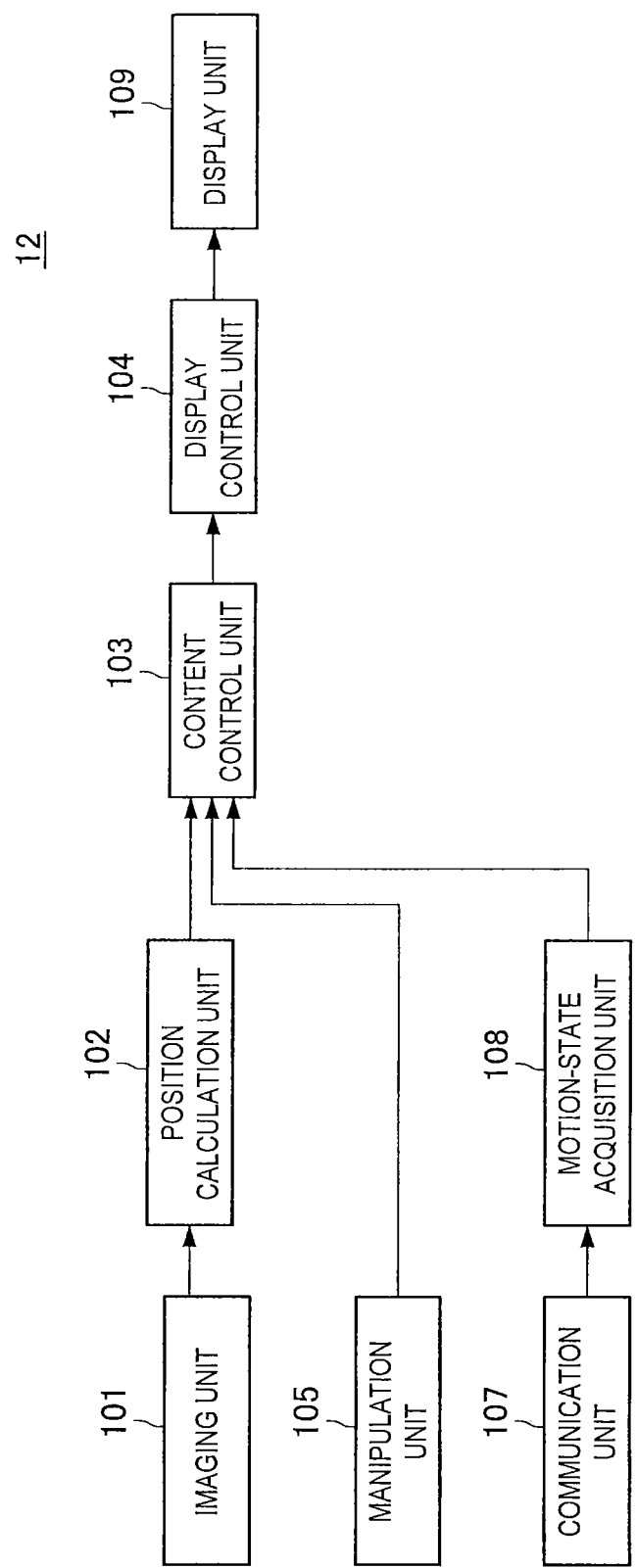
FIG. 7 is a block diagram illustrating a configuration of an information processing apparatus according to a modification of the present embodiment.

Firstly, reference is made to FIG. 7. FIG. 7 is a block diagram illustrating a configuration of the information processing apparatus 12 according to the modification. As illustrated in FIG. 7, the information processing apparatus 12 is different from the aforementioned the information processing apparatus 10 in that the information processing apparatus 12 includes a motion-state acquisition unit 108 instead of the motion-state acquisition unit 106 configured to calculate the motion state based on the captured image. The motion-state acquisition unit 108 acquires the motion state of the real object 20 through a communication unit 107 from a sensor unit 22 to be described later. A configuration of the sensor unit 22 and then an operation of the motion-state acquisition unit 108 will be described.

Figure 8:
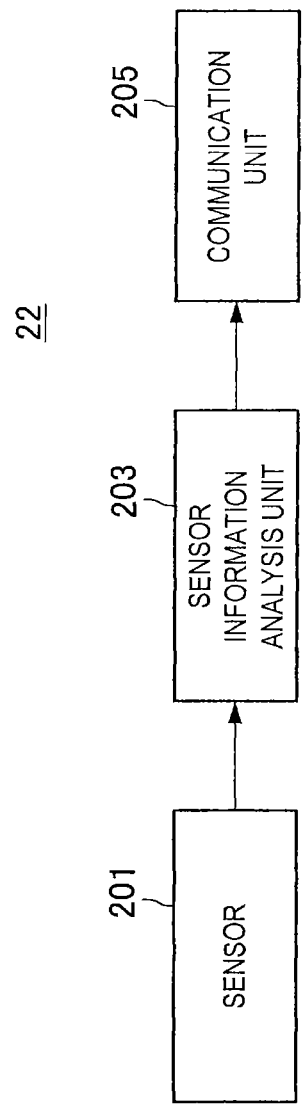
FIG. 8 is a block diagram illustrating a configuration of a sensor unit according to the modification of the present embodiment.

Here, reference is made to FIG. 8. FIG. 8 is a block diagram illustrating a configuration of the sensor unit 22 configured to acquire the motion state of the real object 20. The sensor unit 22 includes a sensor 201, a sensor information analysis unit 203, and a communication unit 205.

The sensor 201 detects the motion state of the real object 20. Any appropriate one may be selected as the sensor 201 according to the motion state of a detection target or a detection method. Specific examples of the sensor 201 include an acceleration sensor, a gyro sensor (angular velocity sensor), an optical sensor, and a magnetic sensor.

For example, to detect the rotational speed of the real object 20, the gyro sensor may be used as the sensor 201. To detect the translation speed or the motion direction of the real object 20, the acceleration sensor may be used as the sensor 201. To detect the rotational speed, the translation speed, or the motion direction of the real object 20 by using the gyro sensor or the acceleration sensor as described above, the sensor unit 22 may be provided to the detection-target real object 20.

The sensor information analysis unit 203 acquires a detection result from the sensor 201 and analyzes the acquired detection result, thereby calculating the motion state of the real object 20. The sensor information analysis unit 203 outputs the calculated motion state of the real object 20 to the communication unit 205 together with the identification information for identifying the real object 20.

The communication unit 205 is a communication module for: acquiring the identification information of the real object 20 and information indicating the motion state from the sensor information analysis unit 203; and transmitting the identification information and the motion state information to each information processing apparatus 12. The communication unit 205 beforehand establishes communication with the information processing apparatus 12 to thereby sequentially transmits the information acquired from the sensor information analysis unit 203, to each information processing apparatus 12 having established communication with the communication unit 205.

Here, reference is again made to FIG. 7. The communication unit 107 is the communication module for transmitting and receiving information from and to the communication unit 205 of each sensor unit 22. The information transmitted from the communication unit 205 is notified to the motion-state acquisition unit 108 through the communication unit 107.

The motion-state acquisition unit 108 acquires the information indicating the motion state of each real object 20 from the corresponding sensor unit 22. At this time, based on the identification information notified in association with the information indicating the motion state from the sensor unit 22, the motion-state acquisition unit 108 recognizes the real object whose motion state is acquired. The motion-state acquisition unit 108 outputs the information indicating the motion state acquired from the sensor unit 22 through the communication unit 107 to the content control unit 103 in association with the identification information of the real object 20 whose motion state is acquired.

In this way, the content control unit 103 can recognize the motion state of each real object 20. Note that subsequent processing is the same as that in the information processing apparatus 10 according to the aforementioned embodiment, and thus a detailed description will be omitted.

Note that the sensor 201 mentioned above is an example, and the type of the sensor 201 is not limited to the example described above as long as the sensor information analysis unit 203 can acquire the motion state of the real object 20 based on a result of detection by the sensor 201.

In addition, if the motion state of each real object 20 can be individually detected, the sensor unit 22 may be provided on the real object 20, depending the type of the sensor 201, or may be provided at a position (for example, on the stage 90) other than the position on the real object 20. For example, the translation speed or the motion direction of the real object 20 may be detected by using the optical sensor or the magnetic sensor as the sensor 201. In this case, for example, the sensor unit 22 may be provided on the stage 90.

In this way, the information processing apparatus 12 according to the modification recognizes the motion state of the real object 20 by using any of the various sensors. This enables the information processing apparatus 12 to detect, for example, a finer motion state difficult to detect in only the image processing and to display the virtual object according to a detection result.

1.5. Conclusion

The information processing apparatus 10 according to the present embodiment acquires the motion state of each real object (for example, the top 20) which is the detection target, and controls the display of the virtual object according to the acquired motion state. Such a configuration enables the user to intuitively know the motion state of the real object based on the display mode of the virtual object.

2. Second Embodiment 2.1. Outline

Next, an information processing apparatus 30 according to a second embodiment of the present disclosure will be described. In the first embodiment, the example of visualizing the motion state of each real object has heretofore been described. In the second embodiment, a description is given of the information processing apparatus 30 which can provide intuitive manipulation feeling to control the motion state of each real object 20. Firstly, before the description of the information processing apparatus 30 according to the present embodiment, difficulties in the present embodiment will be sorted out.

In recent years, various sensory video games have proposed. As such sensory video games, a sensory video game is known in which movement of a real object which is a manipulation target is directly manipulated, for example, by using a position or a posture of a manipulated terminal.

Nevertheless, in a case where a game such as the top spinning which proceeds according to a physical law such as air resistance or friction after tops start spinning, the system of directly manipulating the movement of the real object might not meet an original purpose of the game.

Hence in the second embodiment, it is desirable to provide the information processing apparatus 30 which can provide a more intuitive manipulation feeling in a game proceeding according to a physics rule such as a top spinning.

Figure 9:
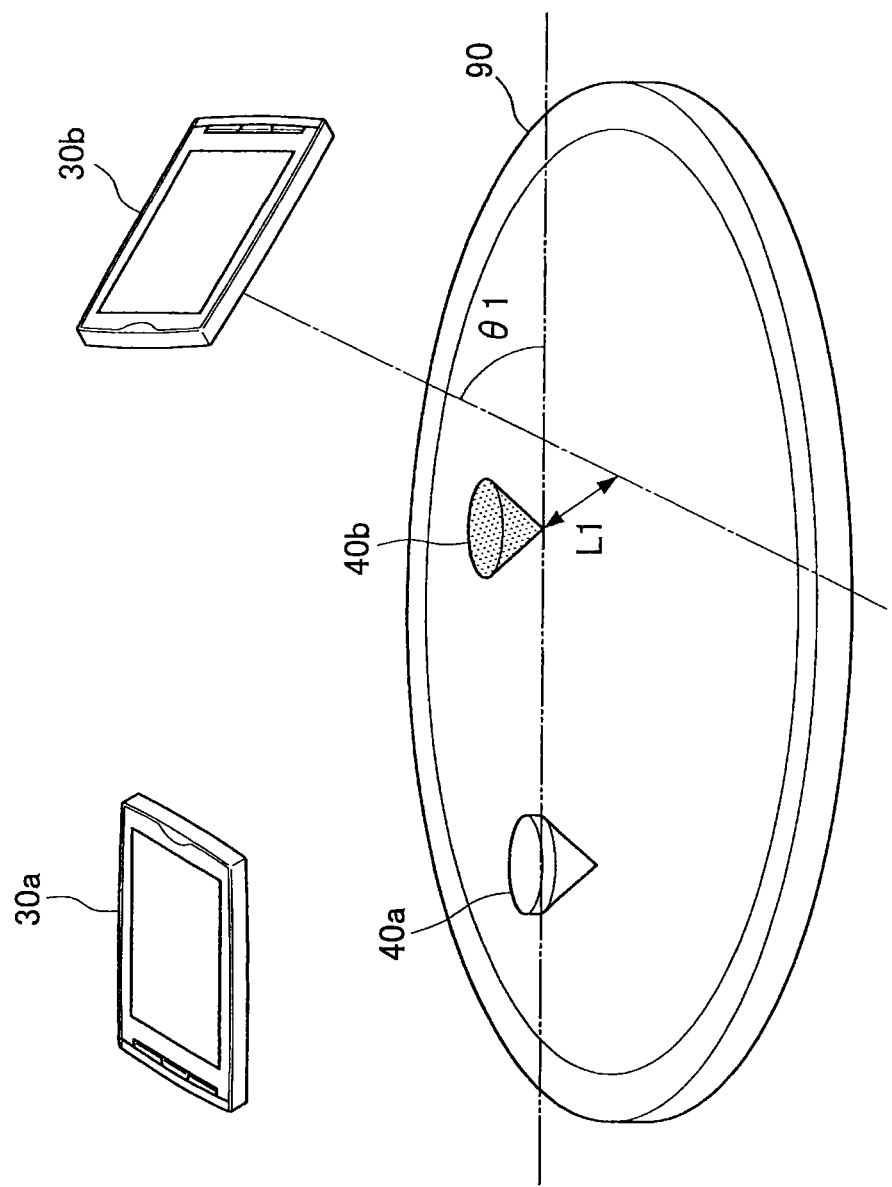
FIG. 9 is a diagram for explaining an outline of an information processing apparatus according to a second embodiment of the present disclosure.

Here, an outline of the information processing apparatus 30 according to the present embodiment will be described with reference to FIGS. 9 and 10. Firstly, reference is made to FIG. 9. FIG. 9 is a diagram for explaining the outline of the information processing apparatus 30 according to the second embodiment of the present disclosure, and illustrates an example of a case where the information processing apparatus 30 is applied to the top spinning game.

In the example of the game illustrated in FIG. 9, the users spin their respective tops 40 which are real objects on the stage 90 which is a real object, and compete with each other for a longer spinning duration between the tops 40 of the users without being flicked away from the stage 90.

Hereinafter, a top 40a and an information processing apparatus 30a are respectively equivalent to the top 40 and the information processing apparatus 30 of the user Ua. Likewise, a top 40b and an information processing apparatus 30b are respectively equivalent to the top 40 and the information processing apparatus 30 of a user Ub. When being not particularly discriminated from each other, the tops 40a and 40b are each simply referred to as the "top 40". Likewise, when being not particularly discriminated from each other, the information processing apparatuses 30a and 30b are each simply referred to as the "information processing apparatus 30".

Each top 40 includes a driving unit 409 configured to change movement (for example, a rotational speed) of the top 40. The information processing apparatus 30 is configured to control the driving unit 409 of the top 40 according to the relative positional relationship associated beforehand between the top 40 and the information processing apparatus 30.

Each user spins his/her top 40 on the stage 90, and controls the movement of the top 40 by manipulating the information processing apparatus 30 while observing the movement of the top 40 via information processing apparatus 30 including an imaging unit 301 and a display unit 309.

At this time, the information processing apparatus 30 controls the driving unit 409 of the top 40 according to the relative positional relationship between the top 40 which is a control target and the information processing apparatus 30. In a specific example, the user manipulates his/her information processing apparatus 30 so that his/her top 40 is displayed on the center of the screen. In this case, the information processing apparatus 30 controls the driving unit 409 so that, for example, a longer distance L1 between an optical axis of the imaging unit 301 and the control-target top 40 leads to higher air resistance or a friction coefficient and thus to difficulty in continuing spinning. In particular, the information processing apparatus 30 may control the driving unit 409 of the top 40 so that the air resistance or the friction coefficient is higher when the top 40 moves out of the screen than when the top 40 is caught within the screen. This enables the information processing apparatus 30 to stage advantageously playing the game when the user continues to catch his/her top 40 on the center of the screen of the information processing apparatus 30 manipulated by the user.

In addition, the information processing apparatus 30 may also control the driving unit 409 of the top 40 according to a relative positional relationship between the stage 90 and the information processing apparatus 30. In a specific example, the information processing apparatus 30 may control the driving unit 409 in such a manner that the position of the center of gravity of the top 40 vertically varies according to an angle of elevation θ1 of the optical axis of the imaging unit 301 with the stage 90. In a specific example, the information processing apparatus 30 may control the driving unit 409 so that, for example, a smaller angle of elevation θ1 leads to a lower center of gravity of the top 40. Meanwhile, in this case, the position of a marker may be tuned so that a smaller angle of elevation θ1 can cause a sight of the marker for recognizing the top 40 to be lost easily. This can stage the game in the following manner. The smaller angle of elevation θ1 leads to the lower center of gravity, and thus the user can play the game advantageously. However, it is difficult to catch the marker within the screen. When the marker moves beyond the screen, the movement influences the user disadvantageously.

The information processing apparatus 30 may also include a manipulation unit 305 such as a touch panel and may change the motion state of the top 40 based on the user manipulation inputted from the manipulation unit 305. For example, when the user taps his/her top 40 displayed on the display unit 309 of the information processing apparatus 30, the information processing apparatus 30 may change the rotational speed of the tapped top 40.

In addition, as in the first embodiment, the information processing apparatus 30 may acquire the motion state of the other top 40 and may visualize and display the acquired motion state on the display unit 309. Note that a mechanism by which the information processing apparatus 30 recognizes the control-target top 40 and controls movement thereof will be described later together with the configuration of the information processing apparatus 30.

Figure 10:
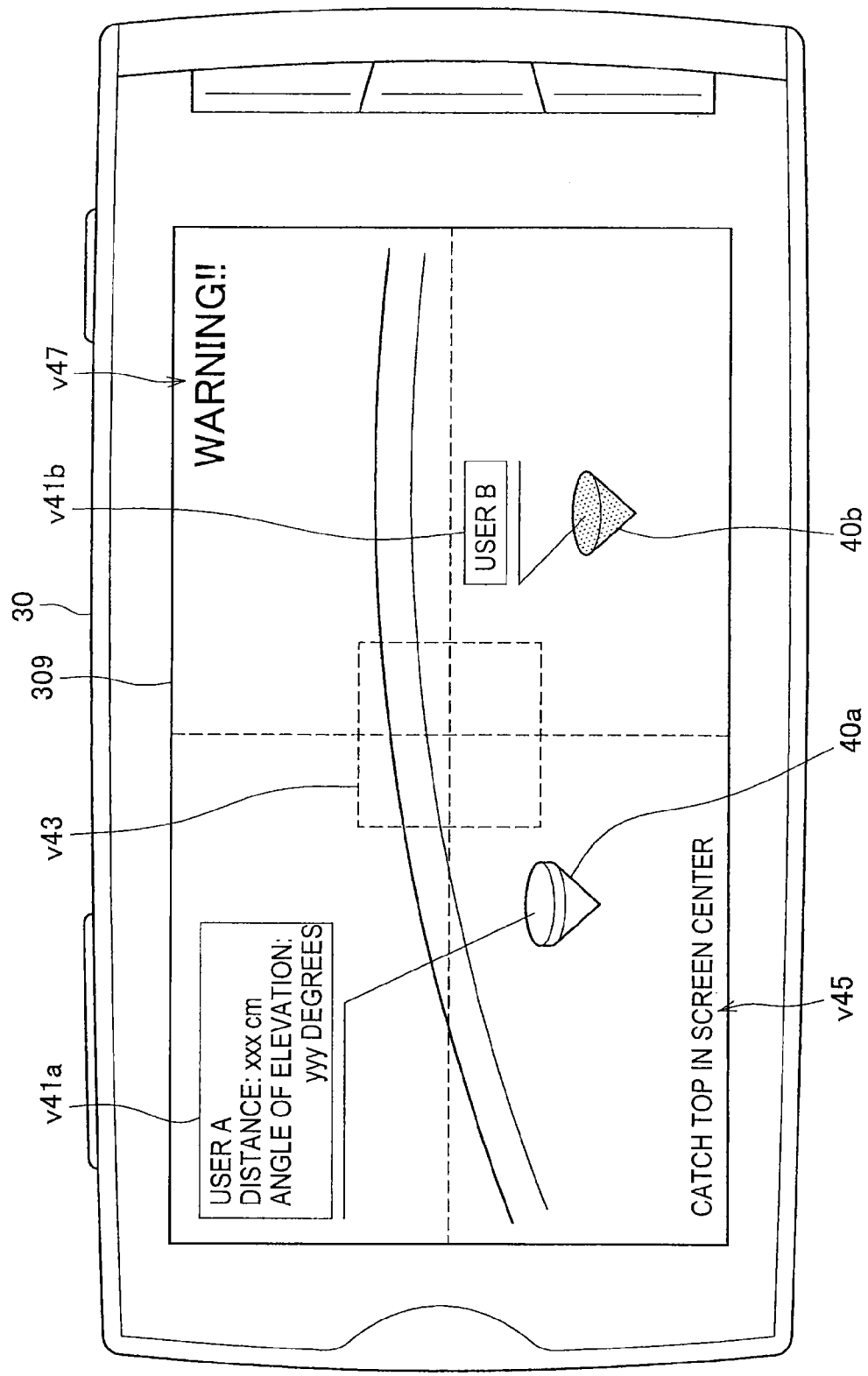
FIG. 10 is a diagram illustrating an example of a screen of the information processing apparatus according to the embodiment.

Here, reference is made to FIG. 10. FIG. 10 is a diagram illustrating an example of the screen of the information processing apparatus 30 according to the present embodiment. in the example in FIG. 10, the information processing apparatus 30 displays virtual objects v45 and v47 serving as guidance for explaining the rule or the progress of the game in such a manner as to superimpose the virtual objects v45 and v47 on an image captured by the imaging unit 301. To facilitate the user manipulation, the information processing apparatus 30 may also display a virtual object v43 serving as a guide in such a manner as to superimpose the virtual object v43 on the captured image.

In the example in FIG. 10 as a specific example, the information processing apparatus 30 controls the driving unit 409 of the top 40 so that the control-target top 40 can continue to spin for a longer time when the user makes an effort to continue to catch his/her own top 40 on the center of the display unit 309 of his/her own information processing apparatus 30. In this case, the information processing apparatus 30 displays a message "catch the top on the center of the screen" as guidance v45 for explaining the rule on the screen displayed on the display unit 309. At this time, the information processing apparatus 30 displays a virtual object v43 indicating the center of the screen as a guide v43 for facilitating the user manipulation of the top 40.

The information processing apparatus 30 may also display the guidance v47 depending on a state of the control-target top 40. In a specific example, when the top 40 is a predetermined or longer distance away from the center of the screen (in other words, the optical axis of the imaging unit 301), (or when the top 40 is not caught within the screen) the information processing apparatus 30 may display a virtual object v47 as guidance for notifying the user of the circumstances. For example, in the example in FIG. 10, the information processing apparatus 30 displays a message "WARNING" as the virtual object v47.

In addition, the information processing apparatus 30 may acquire a relative positional relationship between the control-target top 40 and the information processing apparatus 30 and between the stage 90 and the information processing apparatus 30, and may display a virtual object v41 as display information visualizing the acquired positional relationship. For example, in the example in FIG. 10, the information processing apparatus 30 visualizes and displays, as a virtual object v41a, the distance L1 between the optical axis of the imaging unit 301 and the control-target top 40 and the angle of elevation θ1 of the optical axis of the imaging unit 301 with the stage 90. The information processing apparatus 30 may also visualize and display the air resistance or a friction force (friction coefficient) calculated based on the distance L1 and the angle of elevation θ1 as the virtual object v41a. The information processing apparatus 30 may also display a virtual object v41b as display information visualizing the user of the corresponding top 40 other than the control-target top 40.

As described above, the information processing apparatus 30 according to the present embodiment controls the movement of the top 40 according to the positional relationships between the information processing apparatus 30 and the control-target top 40 and between the information processing apparatus 30 and the stage 90. With such a configuration, a more intuitive manipulation feeling than in a case of directly manipulating a target real object can be provided in the game proceeding according to a physical law such as the top spinning. Hereinafter, details of the information processing apparatus 30 according to the present embodiment will be described.

2.2. Configuration

Figure 11:
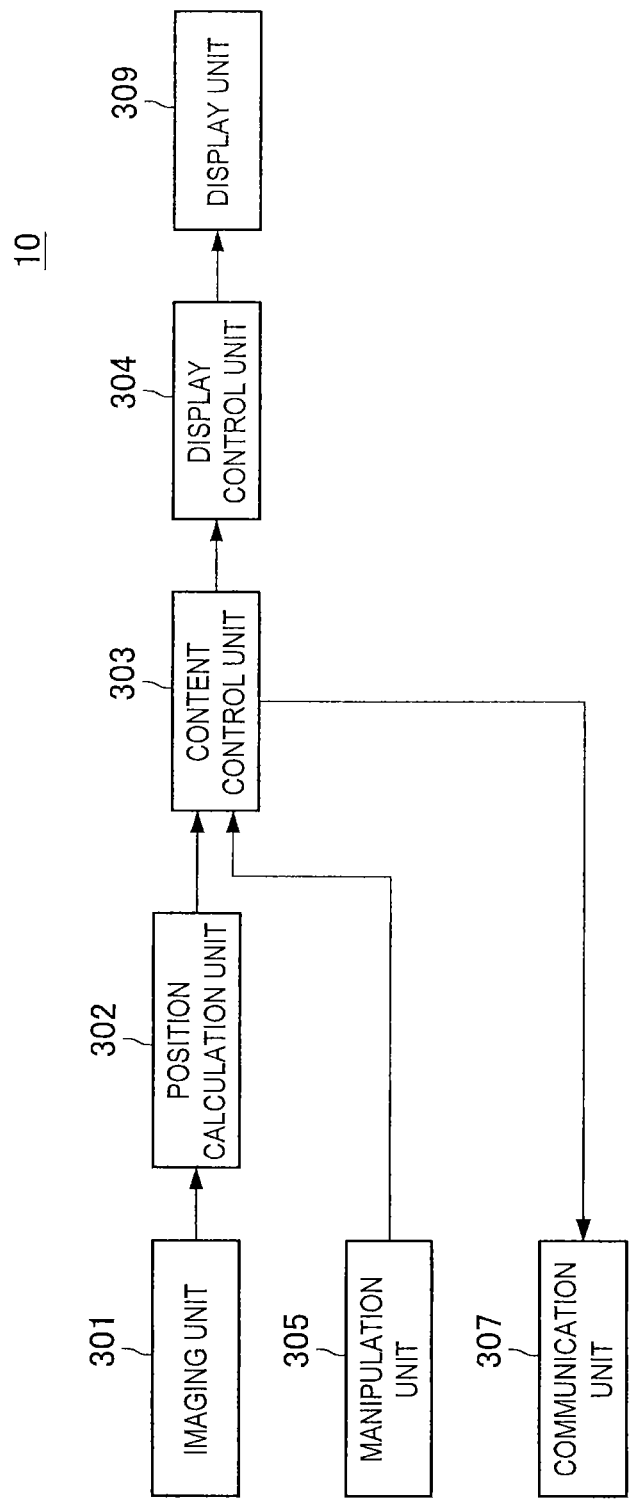
FIG. 11 is a block diagram illustrating a configuration of the information processing apparatus according to the embodiment.
Figure 12:
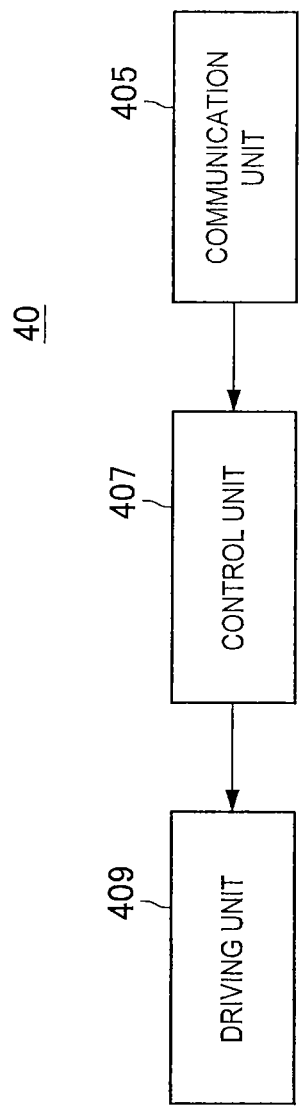
FIG. 12 is a block diagram illustrating a configuration of a real object which is a detection target in the present embodiment.

The configuration of the information processing apparatus 30 according to the present embodiment will be described with reference to FIGS. 11 and 12. FIG. 11 is a block diagram illustrating an example of the configuration of the information processing apparatus 30 according to the present embodiment. FIG. 12 is a block diagram illustrating a configuration of each real object 40 (for example, the top 40) which is the control target of the corresponding information processing apparatus 30 in the present embodiment. Note that the information processing apparatus 30 according to the present embodiment will hereinafter be described by taking as an example a case where the tops 40 which are the real objects are manipulated by using the information processing apparatus 30 in the top spinning game illustrated in FIGS. 9 and 10.

As illustrated in FIG. 11, the information processing apparatus 30 according to the present embodiment includes the imaging unit 301, a position calculation unit 302, a content control unit 303, a display control unit 304, the manipulation unit 305, a communication unit 307, and the display unit 309. As illustrated in FIG. 12, each real object 40 includes a communication unit 405, a control unit 407, and the driving unit 409.

Note that the imaging unit 301 and the position calculation unit 302 in FIG. 11 respectively correspond to the imaging unit 101 and the position calculation unit 102 in the modification of the first embodiment (see FIG. 7). For this reason, a description is given below of the information processing apparatus 30 according to the present embodiment, focusing on part different from the information processing apparatus 12 according to the modification in the first embodiment. As for components operating in the same manner as in the embodiment described above, a detailed description is omitted. A detailed description of the same configuration as in the information processing apparatus 12 is omitted.

The imaging unit 301 captures images every predetermined frames and sequentially outputs the captured images to the position calculation unit 302.

The position calculation unit 302 acquires the captured images sequentially from the imaging unit 301 and detects the tops 40 which is each an example of the real object from the acquired captured images. Note that the position calculation unit 302 detects each top 40 from the captured images like the position calculation unit 102 according to the modification of the first embodiment.

The position calculation unit 302 identifies a reference object serving as a predetermined reference from among the captured images, and identifies a position of the top 40 relative to the reference object.

The position calculation unit 302 sequentially outputs, to the content control unit 303, each captured image acquired from the imaging unit 301, position information of the reference object, and position information indicating the position of each top 40 relative to the reference object. This enables the content control unit 303 to recognize the relative positional relationship between the tops 40 based on the position information of the reference object.

In addition, the stage 90 is provided with a marker. The position calculation unit 302 may detect the marker on the stage 90 captured in the captured image and thereby identify the position and the orientation of the stage 90 in the captured image based on the position and the orientation of the detected marker. The position calculation unit 302 sequentially notifies the content control unit 303 of the identified position information of the stage 90 (that is, the position and the orientation). Note that the position calculation unit 302 may notify the content control unit 303 of the identified position information of the stage 90 as the position of the reference object.

The manipulation unit 305 is a manipulation device such as a touch panel. When receiving input manipulation from the user, the manipulation unit 305 outputs control information indicating the content of input from the user, to the content control unit 303. For example, when being the touch panel, the manipulation unit 305 outputs the control information indicating a position and a mode of touch (for example, tapping or sliding) to the content control unit 303, based on the input manipulation by the user.

The content control unit 303 identifies the relative positional relationship between the information processing apparatus 30 and the control-target top 40, based on the position of each top 40 notified by the position calculation unit 302. Likewise, the content control unit 303 identifies the relative positional relationship between the information processing apparatus 30 and the stage 90 based on the position and the orientation of the stage 90 notified by the position calculation unit 302. The details of the content control unit 303 will be described below.

The content control unit 303 sequentially acquires, from the position calculation unit 302, each image captured by the imaging unit 301, the position information of the reference object, and the position information indicating the position of each top 40 relative to the reference object. The content control unit 303 also sequentially acquires the position information of the stage 90. Note that the content control unit 303 may acquire the position information of the stage 90 as the position information of the reference object.

The content control unit 303 identifies the acquired position of each top 40 in the captured image and the relative positional relationship between the tops 40 (that is, a direction or a distance), based on the position information of the reference object and the position information indicating the position of each top 40 relative to the reference object.

The content control unit 303 also calculates a relative position between at least two of the information processing apparatus 30, the control-target top 40, and the stage 90, based on the position of each top 40 and the position and the orientation of the stage 90 in the captured image. Hereinafter, an example of processing in which the content control unit 303 calculates the relative position between at least two of the information processing apparatus 30, the control-target top 40, and the stage 90 will be described with reference to FIG. 9.

For example, the content control unit 303 may calculate the distance L1 between the optical axis of the imaging unit 301 and the control-target top 40 based on the position and the size of the control-target top 40 in the captured image. Specifically, the content control unit 303 can calculate a scale for a distance difference between the captured image and the real space, based on the size of the top 40 in the captured image. The content control unit 303 may convert a distance between the center of the captured image (that is, the position of the optical axis) and the top 40 into a distance in the real space, based on the calculated scale.

The content control unit 303 may also calculate an orientation of the imaging unit 301 of the information processing apparatus 30 with respect to the stage 90, that is, the angle of elevation θ1 of the optical axis of the imaging unit 301, based on the position and the orientation of the stage 90. In another example, the information processing apparatus 30 may be provided with a gyro sensor, and the content control unit 303 may calculate the angle of elevation θ1 of the optical axis of the imaging unit 301 based on a sensing result of the gyro sensor. In this case, the angle of elevation θ1 is an angle of elevation with a horizontal plane in the real space.

Note that the distance L1 from the optical axis and the angle of elevation θ1 are examples, and the type of the information or a calculation method thereof are not limited as long as information indicating the relative position between at least two of the information processing apparatus 30, the control-target top 40, and the stage 90 can be calculated. Note that a description is given below on the assumption that the content control unit 303 has calculated the distance L1 from the optical axis and the angle of elevation θ1.

The content control unit 303 calculates the air resistance and the friction to be provided to the control-target top 40, based on the calculated distance L1 from the optical axis. Note that how much air resistance and friction is to be provided according to the distance L1 may be predetermined and stored in the content control unit 303. The content control unit 303 calculates an amount of driving the driving unit 409 to be described later, based on the calculated air resistance and friction. Note that the type of the driving unit 409 used for providing the air resistance and the friction with the control-target top 40 and the details of a method of controlling the driving unit 409 will be described together the driving unit 409 later.

In addition, the content control unit 303 calculates the height of the center of gravity of the control-target top 40 based on the calculated angle of elevation θ1. Note that a relationship between the angle of elevation θ1 and the height of the center of gravity may be predetermined and stored in the content control unit 303. The content control unit 303 calculates the amount of driving the driving unit 409 based on the calculated height of the center of gravity.

In addition, the content control unit 303 may vary the amount of driving the driving unit 409 based on the user manipulation inputted to the manipulation unit 305. For example, the content control unit 303 may vary the rotational speed of the top 40 in accordance with the user manipulation. Note that a relationship between the content of the user manipulation and the variation of the rotational speed may be predetermined and stored in the content control unit 303. The content control unit 303 calculates the amount of driving the driving unit 409 based on a variation of the calculated rotational speed.

The content control unit 303 notifies the control-target top 40 of the identification information of the corresponding driving unit 409 which is a driving target and the calculated driving amount, through the communication unit 307. The communication unit 307 is a communication module for transmitting and receiving information to and from each communication unit 405 of the corresponding real object 40.

In addition, the content control unit 303 generates a virtual object for each top 40, and identifies the display position and the display mode of the virtual object based on positional relationships among the information processing apparatus 30, each top 40, and the stage 90. Hereinafter, an example of processing in which the content control unit 303 identifies the display position and the display mode of each virtual object will be described with reference to FIG. 10.

For example, the content control unit 303 may visualize the information (for example, the distance L1 from the optical axis and the angle of elevation θ1) indicating the positional relationships among the information processing apparatus 30, each top 40, and the stage 90 to thereby generate the virtual object v41a as the display information. In this case, the content control unit 303 may determine the display position of the generated virtual object v41a based on the position information of the control-target top 40. The content control unit 303 may also identify the user manipulating the corresponding top 40 based on an identification result of the top 40, visualize the identified user, and generate the virtual object v41b as the display information. In this case, the content control unit 303 may determine the display position of the generated virtual object v41b based on the position information of the corresponding top 40.

The content control unit 303 may also generate the virtual objects v45 and v47 serving as guidance depending on the progress state of the game. The content control unit 303 may also generate the virtual object v43 serving as a guide after the game is started, and may maintain the state where the virtual object v43 is displayed while the game is going on.

The content control unit 303 outputs, to the display control unit 304: the captured image acquired from the position calculation unit 302; and the control information of the generated virtual object. Note that the control information includes display information for displaying each virtual object as an image in the captured image and information indicating the position where the virtual object is displayed. Note that the display control unit 304 and the display unit 309 operate like the display control unit 104 and the display unit 109 in the first embodiment, and thus a detailed description thereof is omitted.

Next, the configuration of the real object 40 (for example, the top 40) will be described with reference to FIG. 12.

The communication unit 405 receives, from the information processing apparatus 30, and output, to the control unit 407, the identification information of the driving-target driving unit 409 and the calculated driving amount transmitted from the content control unit 303 through the communication unit 307. The control unit 407 identifies the driving-target driving unit 409 based on the identification information acquired from the information processing apparatus 30, and drives the identified driving unit 409 based on the acquired driving amount, thereby controlling movement of the top 40. The following summarizes relationships among the movement of the top 40, the type of the driving unit 409, and the control method thereof.

For example, the driving unit 409 may be provided so that the ground contact area of the axis of the top 40 is variable. In this case, the control unit 407 may control the ground contact area by changing the diameter of the axis. As the ground contact area of the axis is increased, a friction force between the axis and a ground plane (for example, the stage 90) is increased. That is, the control unit 407 controls the ground contact area of the axis to thereby control an amount of friction.

In addition, a variable wing configured to apply an air brake in a rotation direction of the top 40 may be provided as the driving unit 409 to extend in the rotation direction of the top 40. In this case, the control unit 407 controls an opening or closing degree of the variable wing to thereby control an amount of the air resistance.

To control the height of the center of gravity, for example, a spindle whose position is changeable in the axial direction of the top 40 may be provided as the driving unit 409. In this case, the control unit 407 controls the position of the spindle and thereby can control the height of the center of gravity of the top 40.

In addition, a motor may be provided as the driving unit 409 in such a manner that the rotational speed of the top 40 is increased or attenuated. In this case, the control unit 407 controls a rotation amount of the motor and thereby can control the rotational speed of the top 40. Note that an impact of the air resistance and the friction may be simulated by using the motor to control the rotational speed of the top 40.

Figure 13:
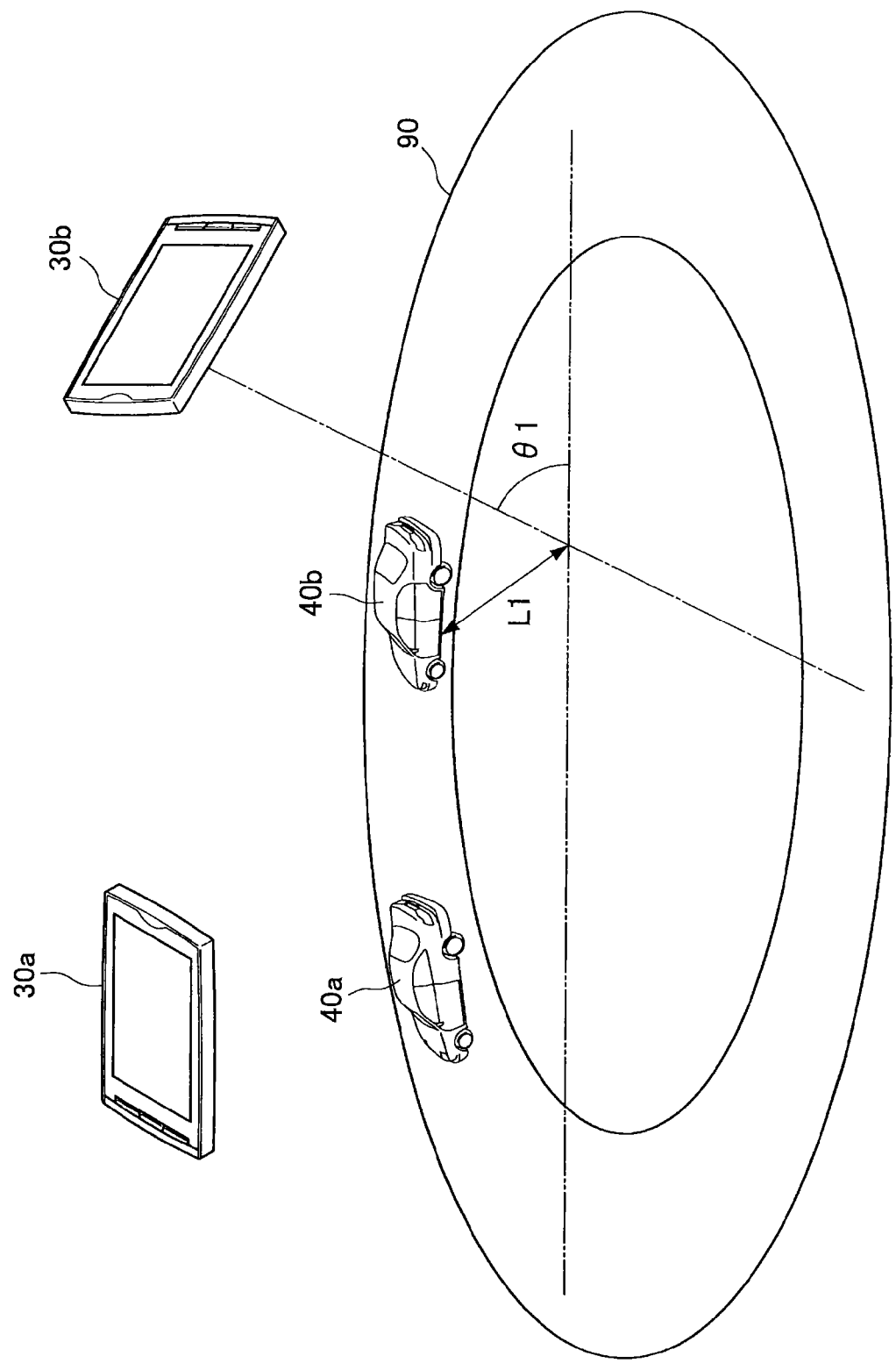
FIG. 13 is a diagram for explaining another mode of the information processing apparatus according to the embodiment.

Note that the description has been given by taking the top spinning game as an example, but the control of the movement of the target real object 40 is not limited to the aforementioned example as long as the movement of the real object 40 can be controlled based on the relative position between at least two of the information processing apparatus 30, the real object 40, and the stage 90. For example, FIG. 13 is a diagram for explaining another mode of the information processing apparatus 30 according to the present embodiment and illustrates a case where the information processing apparatus 30 is applied to a race game. In this case, the information processing apparatus 30 may calculate the distance L1 from the optical axis of the imaging unit 301 and the angle of elevation θ1 on the assumption that each real object 40 and the stage 90 are a vehicle body and a course, respectively, and may control movement of the vehicle body 40 based on the calculation result.

Figure 14:
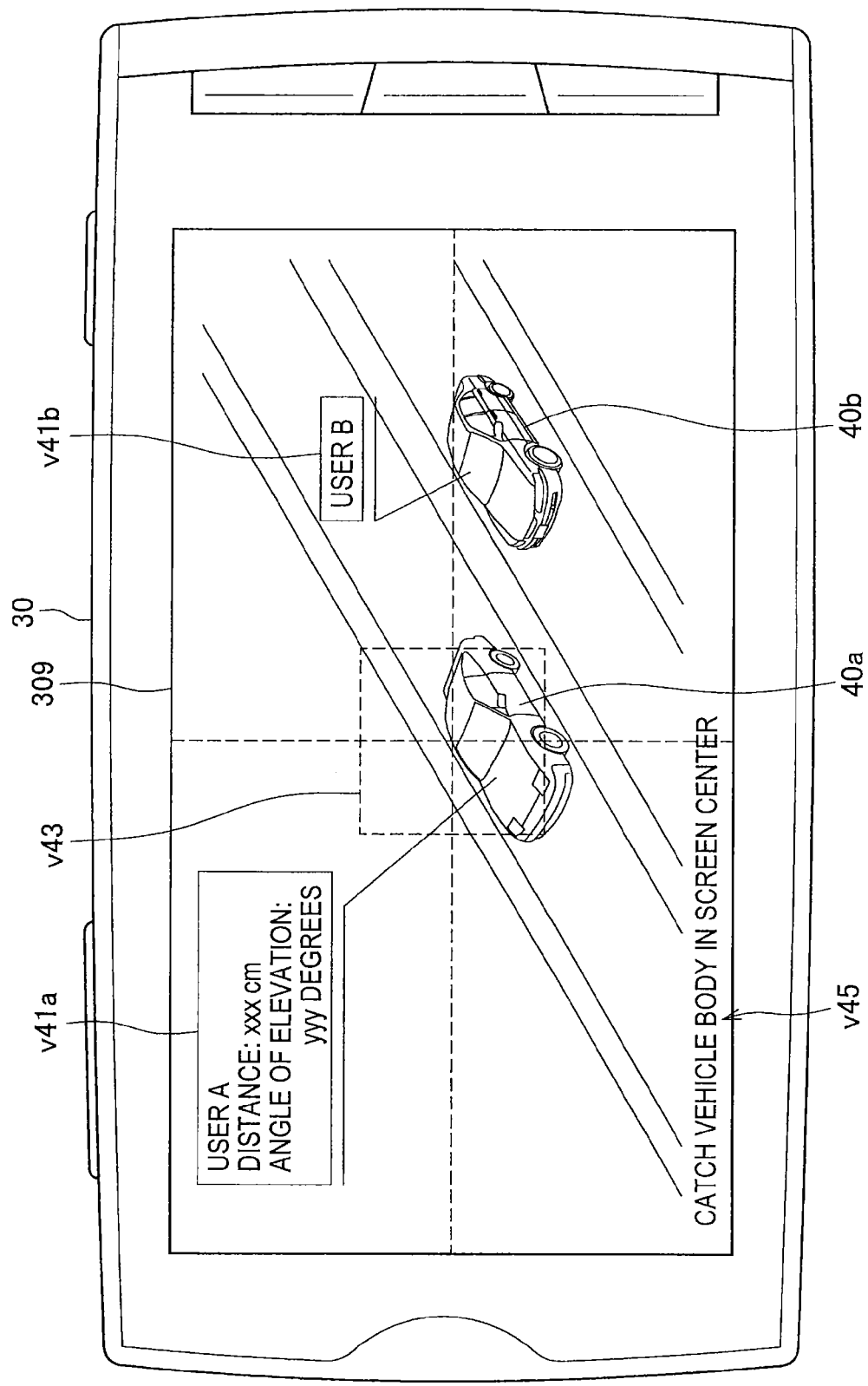
FIG. 14 is a diagram illustrating an example of a screen of the information processing apparatus according to the embodiment in still another mode.

Here, reference is made to FIG. 14. FIG. 14 is a diagram illustrating an example of a screen of the information processing apparatus according to the embodiment in another mode, and illustrates an example of a manipulation screen of the race game illustrated in FIG. 13. In this case, the information processing apparatus 30 may display the virtual object v41a as display information visualizing the distance L1 between the optical axis of the imaging unit 301 and the vehicle body 40 which is a control target and the angle of elevation θ1 of the optical axis of the imaging unit 301 with the stage 90. The information processing apparatus 30 may display the virtual object v41b as the display information visualizing the user of the corresponding vehicle body 40 other than the control target vehicle body 40.

In addition, as in the example of the top spinning game illustrated in FIG. 10, the virtual objects v45 and v47 serving as the guidance and the virtual object v43 serving as the guide may be displayed in each captured image in the superimposed manner.

2.3. Processing

Figure 15:
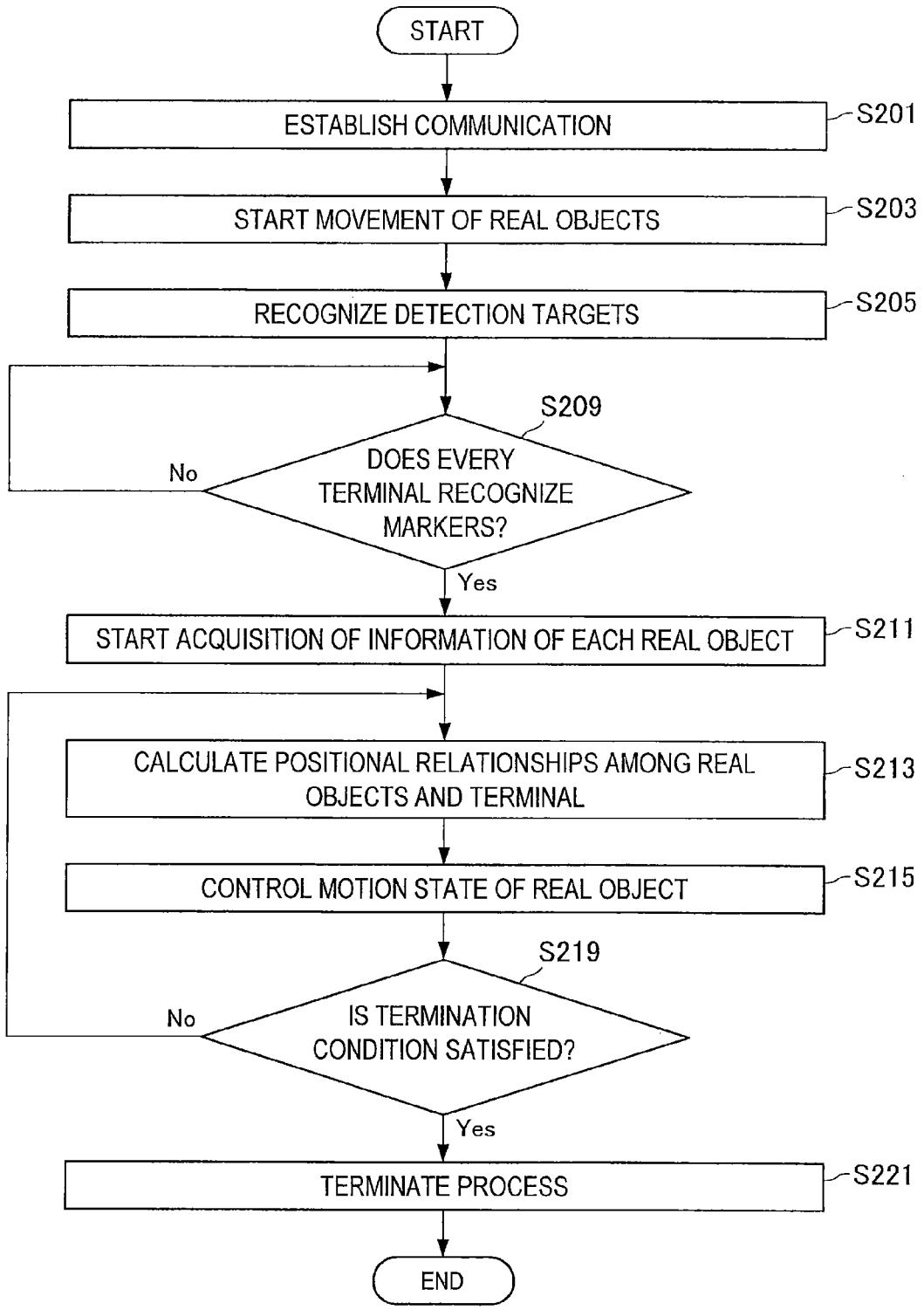
FIG. 15 is a flowchart illustrating an example of a series of operations of the information processing apparatus according to the embodiment.

A series of operations of the information processing apparatus according to the present embodiment will be described with reference to FIG. 15. FIG. 15 is a flowchart illustrating an example of the series of operations of the information processing apparatus according to the present embodiment.

(Step S201)

The communication unit 307 of the information processing apparatus 30 establishes communication with the communication unit 405 of the control-target top 40. Subsequently, information from the information processing apparatus 30 is transmitted to the top 40 through the established communication path.

(Step S203)

When each user spins his/her top 40 which is a real object on the stage 90, the real object top 40 starts movement.

(Step S205)

Next, the user starts observation of the tops 40 and the stage 90 by using the corresponding information processing apparatus 30 including the imaging unit 301 and the display unit 309, the position calculation unit 302 acquires each captured image from the imaging unit 301. The position calculation unit 302 detects the marker provided on each top 40 from the captured image acquired from the imaging unit 301 to thereby recognize the position and the posture of the top 40.

The position calculation unit 302 identifies a predetermined reference object from the captured image and identifies a position of the top 40 relative to the identified reference object. For example, the position calculation unit 302 detects the marker on the stage 90 captured in the captured image and thereby identifies the position of the stage 90 based on the position of the detected marker. The position calculation unit 302 identifies the position of each top 40 by using the identified stage 90 as the reference object.

The position calculation unit 302 sequentially outputs, to the content control unit 303, each captured image acquired from the imaging unit 301, position information of the reference object, and position information indicating the position of each top 40 relative to the reference object.

(Step S209)

In this way, the information processing apparatus 30 of every user recognizes the markers of the tops 40 and the stage 90 (N in Step S209).

(Step S211)

After the information processing apparatus 30 of every user completes the recognition of the tops 40 and the marker on the stage 90 (Y in Step S209), the information processing apparatus 30 starts acquisition of relative positional relationships among the information processing apparatus 30, the control-target top 40, and the stage 90.

(Step S213)

The position calculation unit 302 sequentially acquires each captured image from the imaging unit 301 and detects each top 40 which is the real object from the acquired captured image. Note that the position calculation unit 302 detects the top 40 from the captured image, like the position calculation unit 102 according to the modification of the first embodiment.

The position calculation unit 302 identifies the reference object predetermined as a reference, in the captured image, and identifies a position of each top 40 relative to the identified reference object.

The position calculation unit 302 sequentially outputs, to the content control unit 303, the captured image acquired from the imaging unit 301, the position information of the reference object, and the position information indicating the position of each top 40 relative to the reference object.

The position calculation unit 302 may also detect the marker on the stage 90 captured in the captured image and thereby identify the position and the orientation of the stage 90 in the captured image based on the position and the orientation of the detected marker. The position calculation unit 302 sequentially notifies the content control unit 303 of the identified position information of the stage 90 (that is, the position and the orientation). Note that the position calculation unit 302 may notify the content control unit 303 of the identified position information of the stage 90 as the position of the reference object.

(Step S215)

The content control unit 303 sequentially acquires, from the position calculation unit 302, each image captured by the imaging unit 301, the position information of the reference object, and the position information indicating the position of each top 40 relative to the reference object. The content control unit 303 also sequentially acquires the position information of the stage 90. Note that the content control unit 303 may acquire the position information of the stage 90 as the position information of the reference object.

The content control unit 303 identifies the acquired position of the top 40 in the captured image and the relative positional relationship between the tops 40 (that is, the direction and the distance) based on the position information of the reference object and the position information indicating the position of each top 40 relative to the reference object.

The content control unit 303 also calculates the relative position between at least two of the information processing apparatus 30, the control-target top 40, and the stage 90, based on the position of each top 40 and the position and the orientation of the stage 90 in the captured image.

For example, the content control unit 303 may calculate the distance L1 between the optical axis of the imaging unit 301 and the control-target top 40 based on the position and the size of the control-target top 40 in the captured image.

The content control unit 303 calculates the air resistance and the friction to be provided to the control-target top 40 based on the calculated distance L1 from the optical axis. Note that how much air resistance and friction is to provide according to the distance L1 may be predetermined and stored in the content control unit 303. The content control unit 303 calculates an amount of driving the driving unit 409 to be described later, based on the calculated air resistance and friction.

The content control unit 303 may also calculate the orientation of the imaging unit 301 of the information processing apparatus 30 with respect to the stage 90, that is, the angle of elevation θ1 of the optical axis of the imaging unit 301, based on the position and the orientation of the stage 90.

The content control unit 303 calculates the height of the center of gravity of the control-target top 40 based on the calculated angle of elevation θ1. The content control unit 303 calculates the amount of driving the driving unit 409 based on the calculated height of the center of gravity.

In addition, the content control unit 303 may vary the amount of driving the driving unit 409 based on the user manipulation inputted to the manipulation unit 305. For example, the content control unit 303 may vary the rotational speed of the top 40 in accordance with the user manipulation. The content control unit 303 calculates the amount of driving the driving unit 409 based on the variation of the calculated rotational speed.

The content control unit 303 notifies the control-target top 40 of the identification information of the corresponding driving unit 409 which is the driving target and the calculated driving amount, through the communication unit 307.

The communication unit 405 receives, from the information processing apparatus 30, and output, to the control unit 407, the identification information of the driving-target driving unit 409 and the calculated driving amount transmitted from the content control unit 303 through the communication unit 307. The control unit 407 identifies the driving-target driving unit 409 based on the identification information acquired from the information processing apparatus 30, and drives the identified driving unit 409 based on the acquired driving amount, thereby controlling movement of the top 40.

(Step S219)

The information processing apparatus 30 repeats the series of processes illustrated in Steps S213 to S215 until a predetermined condition for terminating the game is satisfied (N in Step S219).

(Step S221)

When the condition for terminating the game is satisfied (Y in Step S219), the information processing apparatus 30 stops the acquisition of the relative positional relationships among the information processing apparatus 30, the control-target top 40, and the stage 90 to terminate the series of processes.

As described above, the information processing apparatus 30 according to the present embodiment controls the movement of the control-target top 40 according to the positional relationships among the information processing apparatus 30, the control-target top 40, and the stage 90. With such a configuration, a more intuitive manipulation feeling than in the case of directly manipulating a target real object can be provided in the game proceeding according to the physical law such as the top spinning.

Figure 16:
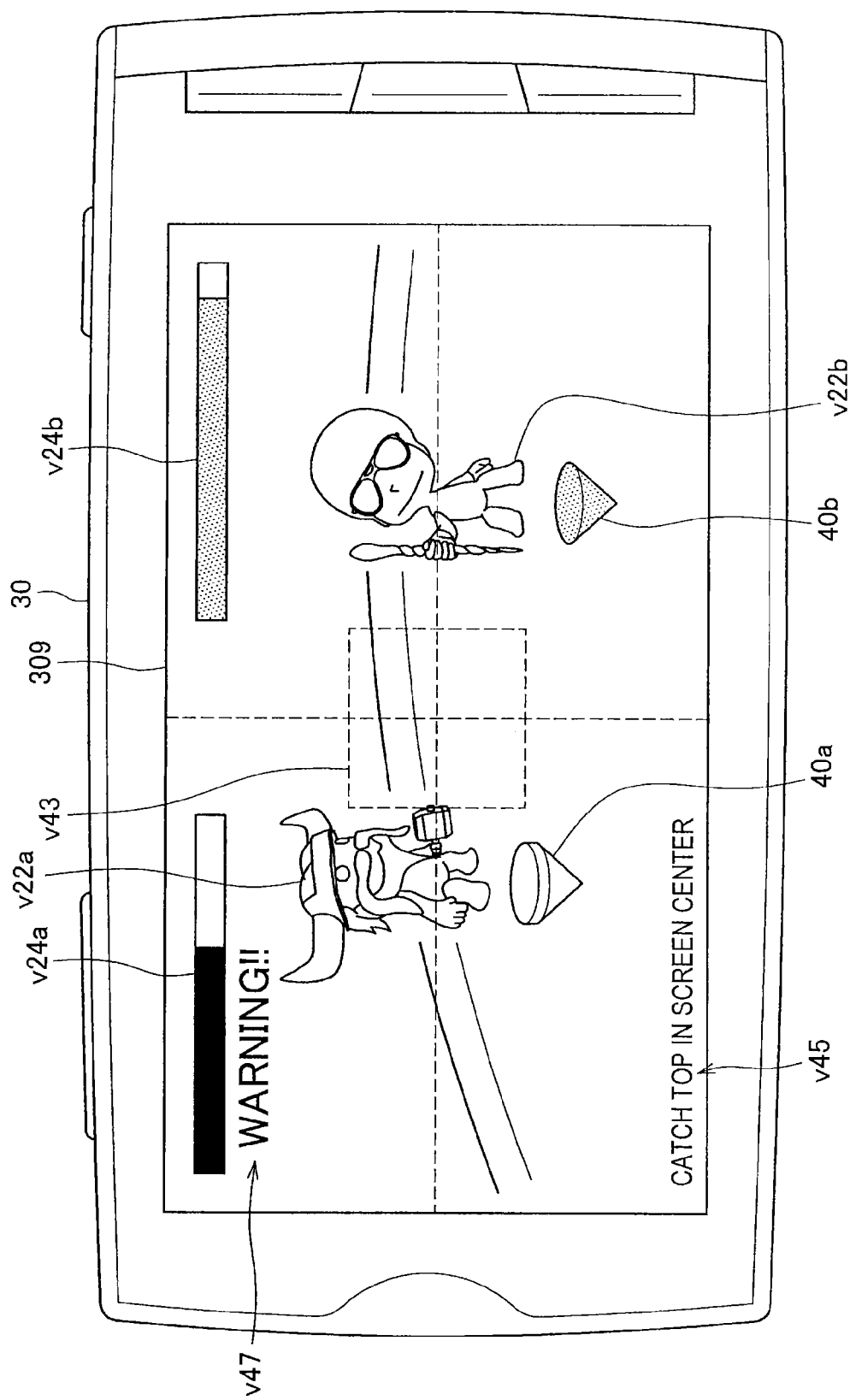
FIG. 16 is a diagram illustrating an example of a screen of the information processing apparatus according to the embodiment in yet another mode.

Note that the aforementioned information processing apparatus 30 according to the second embodiment may be combined with the information processing apparatus 10 according to the first embodiment (or the information processing apparatus 12 according to the modification in the first embodiment), and thereby each virtual object may be displayed based on the motion state of the corresponding top 40 varied in accordance with the manipulation of the information processing apparatus 30. For example, FIG. 16 is a diagram illustrating an example of a screen of the information processing apparatus according to the present embodiment in another mode, and illustrates an example of a case where virtual objects in accordance with the motion states of the tops 40 are displayed in such a manner as to be superimposed on the display screen illustrated in FIG. 10.

Specifically, the motion-state acquisition unit 106 according to the first embodiment may be added to the information processing apparatus 30 according to the second embodiment to thereby acquire the motion state of each top 40 from the imaging unit 301 based on the captured image. In another example, the sensor unit 22 and the motion-state acquisition unit 108 according to the modification of the first embodiment may be added to the information processing apparatus 30 according to the second embodiment to thereby acquire the motion state of the top 40 based on a detection result of the sensor 201.

The content control unit 303 may generate the virtual objects v22a and v22b taking forms of the characters based on the acquired motion states. The content control unit 303 may also generate or control the virtual objects v24a and v24b respectively indicating the life points of the virtual objects v22a and v22b. In still another example, the content control unit 303 may generate virtual objects as display information visualizing the acquired motion states.

As described above, the first embodiment and the second embodiment may be combined with each other, and thereby the information processing apparatus 30 can present, as the virtual object, the ever-changing motion state of each top 40 in accordance with manipulation of the information processing apparatus 30. With such a configuration, the user can control the movement of the control-target top 40 by manipulating the information processing apparatus 30, and can recognize the motion state of the top 40 varied under the control, based on the display mode of the displayed virtual object.

2.4. Conclusion

As described above, the information processing apparatus 30 according to the present embodiment controls the driving unit 409 of the corresponding top 40 according to the positional relationships among the information processing apparatus 30, the control-target top 40, and the stage 90 to thereby simulate the impact of the air resistance and the friction on the top 40. With such a configuration, a more intuitive manipulation feeling than in the case of directly manipulating a target real object can be provided in the game proceeding according to the physical law such as the top spinning.

3. Third Embodiment

3.1. Outline

Next, an information processing apparatus 50 according to a third embodiment of the present disclosure will be described. The aforementioned information processing apparatus 30 according to the second embodiment controls movement of a real object according to the relative positional relationships among the real object in the real space, the information processing apparatus, and the stage. Alternatively, the control target may be a virtual object in a virtual space, in stead of the real object. In the third embodiment, a description is given of a case where movement of a virtual object is controlled by using the virtual object as the control target, and simulating an impact of the physical law such as the air resistance and the friction force on the virtual object.

Figure 17:
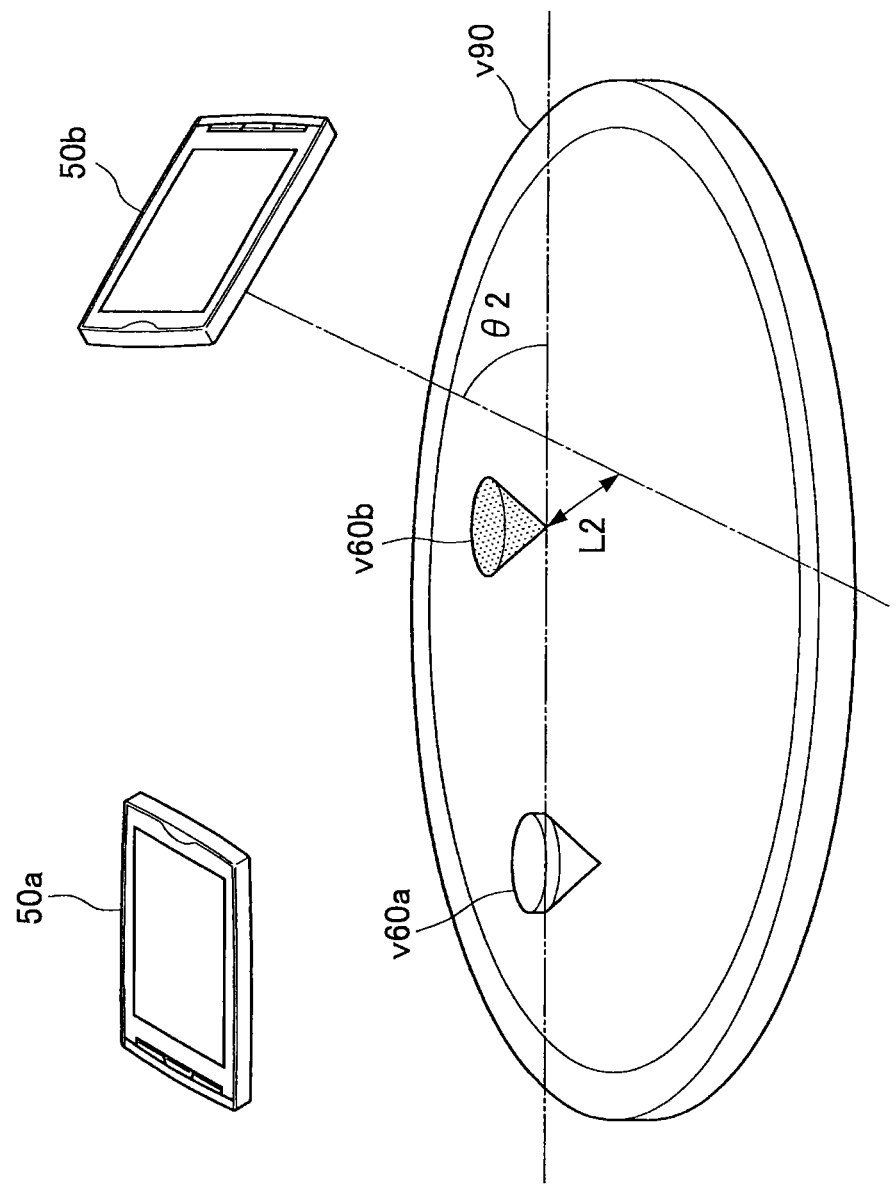
FIG. 17 is a diagram for explaining an outline of an information processing apparatus according to a third embodiment of the present disclosure.

Hereinafter, an outline of the information processing apparatus 50 according to the third embodiment of the present disclosure will be described with reference to FIGS. 17 and 18. Firstly, reference is made to FIG. 17. FIG. 17 is a diagram for explaining the outline of the information processing apparatus 50 according to the third embodiment of the present disclosure, and illustrates an example of a case where the information processing apparatus 50 is applied to the top spinning game.

In the example of the game illustrated in FIG. 17, each of the plurality of users observes a stage v90 and tops v60 which are virtual objects in the virtual space by using the corresponding information processing apparatus 50 including an imaging unit 501 and a display unit 509. The user manipulates the information processing apparatus 50 in the same manner as in the second embodiment to thereby control movement of the corresponding top v60 in the virtual space.

At this time, the information processing apparatus 50 detects a marker serving as a reference in each image captured by the imaging unit 501, and calculates relative positions of the stage v90, the tops v60, and the information processing apparatus 50 in the virtual space based on the position, the orientation, and the size of the marker in the captured image. The information processing apparatus 50 calculates: a distance L2 between an optical axis of the imaging unit 501 and the corresponding top v60 which is a control target in the virtual space; and an angle of elevation θ2 of the optical axis of the imaging unit 501 with the stage v90, based on the relative positions in the same manner as in the second embodiment. Then, the information processing apparatus 50 calculates movement of the control-target top v60 based on the distance L2 from the optical axis and the angle of elevation θ2, and controls the display position and the display mode of the virtual object tops v60.

Figure 18:
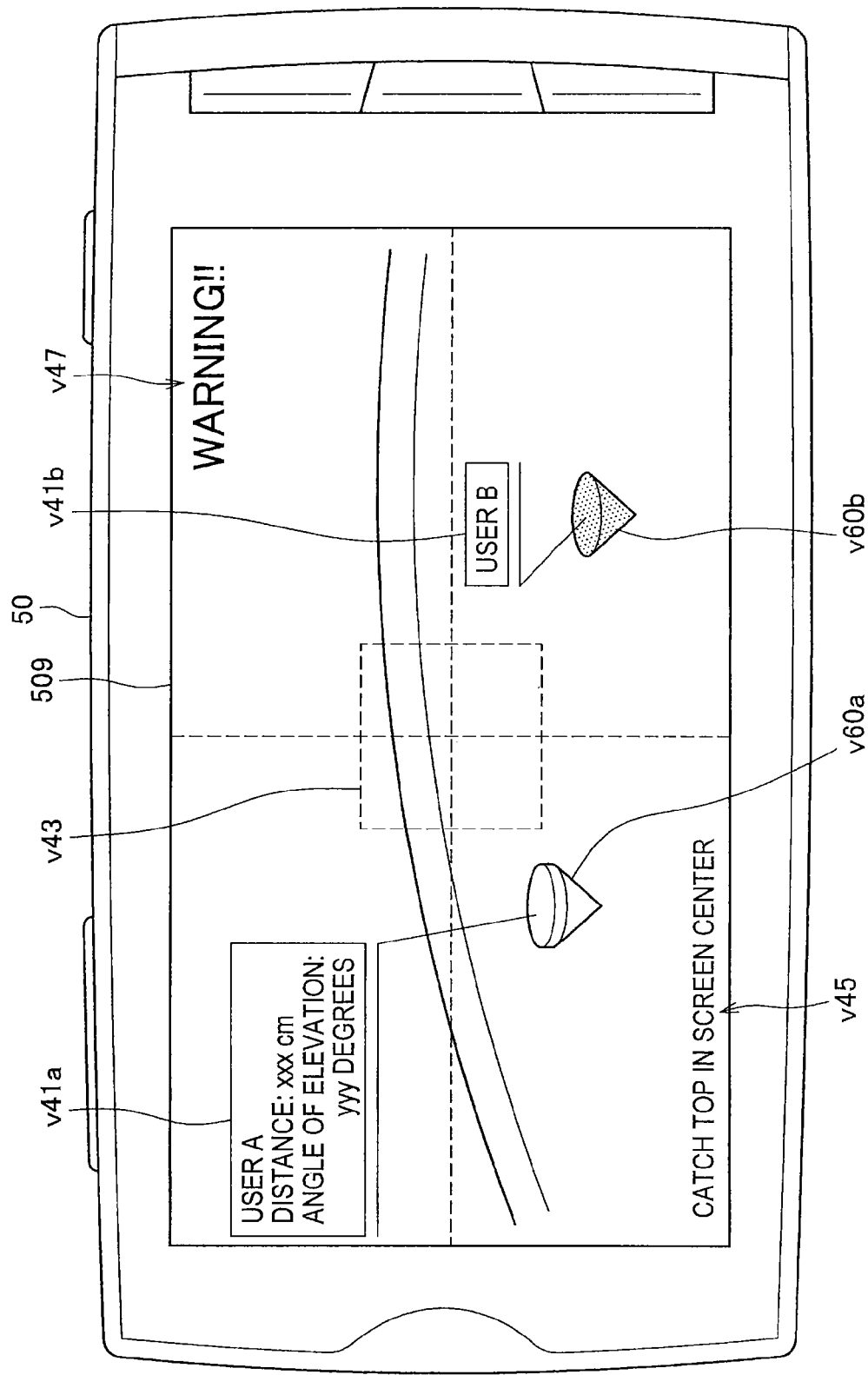
FIG. 18 is a diagram illustrating an example of a screen of the information processing apparatus according to the embodiment.

Here, reference is made to FIG. 18. FIG. 18 is a diagram illustrating an example of a screen of the information processing apparatus 50 according to the present embodiment. The information processing apparatus 50 identifies a display position and a display mode of each top v60 based on positional relationships between the tops v60, the calculated distance L2 from the optical axis, and the calculated angle of elevation θ2. The information processing apparatus 50 then displays the tops v60 in the superimposed manner in the captured image. For example, in the example in FIG. 18, the information processing apparatus 50 displays the tops v60a and v60b in the superimposed manner in the captured image.

The information processing apparatus 50 may also acquire a relative positional relationship between the control-target top v60 and the information processing apparatus 50 and a relative positional relationship between the stage v90 and the information processing apparatus 50, and may then display the virtual object v41a as display information visualizing the acquired positional relationship. For example, in the example in FIG. 18, the information processing apparatus 50 visualizes and displays, as the virtual object v41a, the distance L2 between the optical axis of the imaging unit 501 and the control-target top v60 and the angle of elevation θ2 of the optical axis of the imaging unit 501 with the stage v90. The information processing apparatus 50 may also display the virtual object v41b as display information visualizing the user of the corresponding top v60 other than the control-target top v60.

As described above, the information processing apparatus 50 according to the present embodiment controls the movement of the corresponding top v60 according to the positional relationships among the information processing apparatus 50, the tops v60, and the stage v90 in the virtual space. With such a configuration, each top 40 which is the real object is displayed as the corresponding virtual object v60, and thus the same game as in the second embodiment can be implemented without using the top 40 which is an example of the real object. Hereinafter, details of the information processing apparatus 50 according to the present embodiment will be described.

3.2. Configuration

Figure 19:
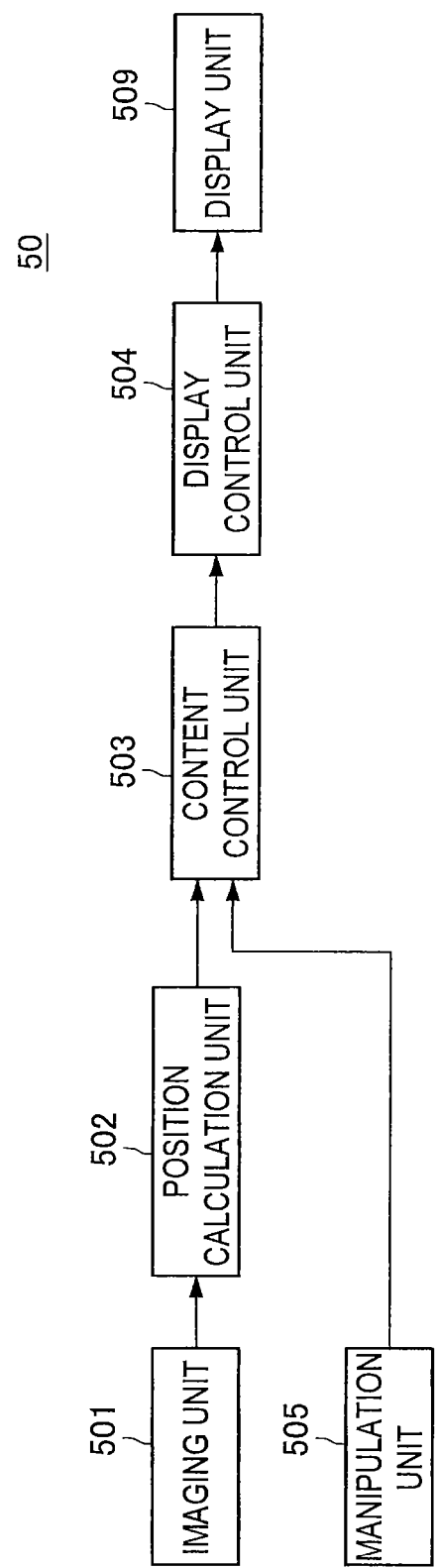
FIG. 19 is a block diagram illustrating a configuration of the information processing apparatus according to the embodiment.

A configuration of the information processing apparatus 50 according to the present embodiment will be described with reference to FIG. 19. FIG. 19 is a block diagram illustrating the configuration of the information processing apparatus 50 according to the present embodiment. Note that the information processing apparatus 50 according to the present embodiment will hereinafter be described by taking as an example a case where the corresponding top v60 which is the virtual object is manipulated by using the information processing apparatus 50 in the top spinning game illustrated in FIGS. 17 and 18.

As illustrated in FIG. 19, the information processing apparatus 50 according to the present embodiment includes the imaging unit 501, a position calculation unit 502, a content control unit 503, a display control unit 504, a manipulation unit 505, and the display unit 509.

The imaging unit 501 captures an image every predetermined frames and sequentially outputs each captured image to the position calculation unit 502.

The position calculation unit 502 sequentially acquires each captured image from the imaging unit 501. The position calculation unit 502 detects markers based on which virtual objects such as the tops v60 are generated, in the captured image acquired from the imaging unit 501. Note that the position calculation unit 502 detects the markers like the position calculation unit 102 according to the first embodiment.

The position calculation unit 502 sequentially outputs, to the content control unit 503, the captured image acquired from the imaging unit 501 and position information indicating the position of each detected marker.

The content control unit 503 sequentially acquires the image captured by the imaging unit 501 and the position information indicating the position of the detected marker from the position calculation unit 502.

The content control unit 503 identifies the position and the orientation of the information processing apparatus 50 in the virtual space with respect to the position of the marker, based on the position, the direction, and the size of the marker in the acquired captured image.

The content control unit 503 also generates the virtual object tops v60 for the respective information processing apparatuses 50 manipulated by the respective users, and associates the tops v60 with the respective information processing apparatus 50. At this time, the content control unit 503 identifies one of the tops v60 which is to be a control target of the content control unit 503. The content control unit 503 also generates the stage v90 which is another virtual object.

The content control unit 503 identifies positions of each generated top v60 and the stage v90 in the virtual space, with respect to the positions of the markers.

When receiving predetermined manipulation from, for example, the manipulation unit 505, the content control unit 503 starts motion of the generated top v60.

The content control unit 503 calculates the motion state (for example, the motion direction, the translation speed, and the rotational speed) of each top v60 based on relative positions between the tops v60 and a relative position between each top v60 and the stage v90, and controls the movement of the corresponding top v60.

In a specific example, the content control unit 503 determines whether the plurality of the tops v60 come into contact with each other, based on the relative positions between the tops v60. When the tops v60 come into contact with each other, the content control unit 503 may calculate the motion direction of each top v60 to be exhibited after the contact, based on a contacting direction of the top v60. The content control unit 503 may also calculate a translation speed and a rotational speed of the top v60 to be exhibited after the contact, based on the translation speed and the rotational speed of the top v60 exhibited before the contact.

The content control unit 503 may also determine whether any of the tops v60 comes into contact with, for example, a side wall of the stage v90 based on the relative position between the top v60 and the stage v90. When the top v60 comes into contact with the side wall of the stage v90, the content control unit 503 may calculate the motion direction of the top v60 to be exhibited after the contact, based on a direction of the top v60 coming into contact with the side wall of the stage v90. The content control unit 503 may also calculate the translation speed and the rotational speed of the top v60 to be exhibited after the contact, based on the translation speed and the rotational speed of the top v60 exhibited before the contact.

The content control unit 503 also calculates a relative position in the virtual space between at least two of the information processing apparatus 50, the control-target top v60, and the stage v90, in the same manner as in the information processing apparatus 30 according to the second embodiment. The content control unit 503 controls the movement of the control-target top v60 based on the calculated relative position.

In a specific example, the content control unit 503 may calculate the distance L2 between the optical axis of the imaging unit 501 and the control-target top v60 based on the position and the orientation of the information processing apparatus 50 and the position of the control-target top v60 in the virtual space.

The content control unit 503 may also calculate the angle of elevation θ2 of the optical axis of the imaging unit 501 with the stage v90, based on: the position and the orientation of the information processing apparatus 50; and the position and the orientation of the stage v90, in the virtual space. The information processing apparatus 50 may also include a gyro sensor, and thereby the content control unit 503 may calculate the angle of elevation θ2 of the optical axis of the imaging unit 501 based on a result of detection by the gyro sensor. In this case, the angle of elevation θ2 is an angle of elevation with a horizontal plane in the real space.

Note that the distance L2 from the optical axis and the angle of elevation θ2 which are described above are examples, and the type of the information and a calculation method thereof are not limited as long as information indicating the relative position between at least two of the information processing apparatus 50, the control-target top v60, and the stage v90 can be calculated. Note that a description is given below on the assumption that the content control unit 503 has calculated the distance L2 from the optical axis and the angle of elevation θ2.

The content control unit 503 calculates physical quantities (for example, friction and the air resistance) for varying the motion state of the top v60 based on the relative positions among the information processing apparatus 50, the control-target top v60, and the stage v90.

In a specific example, the content control unit 503 may calculate the air resistance and the friction to be provided to the control-target top v60, based on the calculated distance L2 from the optical axis. The content control unit 503 may calculate the height of the center of gravity of the control-target top v60 based on the calculated angle of elevation θ2. The content control unit 503 may calculate a variation of the rotational speed of the top v60 in accordance with the user manipulation performed through the manipulation unit 505. Note that the friction, the air resistance, and the variation of the rotational speed which are described above may be calculated in the same manner as in the information processing apparatus 30 according to the second embodiment.

The content control unit 503 varies the motion state of the top v60 according to the calculated physical quantities.

As described above, the content control unit 503 identifies the relative positions among the information processing apparatus 50, the tops v60, and the stage v90 in the virtual space, based on the captured image and the positional information of the markers sequentially acquired from the position calculation unit 502. Then, the content control unit 503 controls movement of the corresponding top v60, based on the identified relative positions among the information processing apparatus 50, the tops v60, and the stage v90. The content control unit 503 sequentially repeats the aforementioned identification of the relative positions among the information processing apparatus 50, the tops v60, and the stage v90, and the aforementioned control of the movement of the top v60.

Here, reference is made to FIG. 18. As illustrated in FIG. 18, the content control unit 503 may generate the virtual object v41a visualizing the information (for example, the distance L2 from the optical axis and the angle of elevation θ2) indicating the positional relationships with the corresponding top v60 and the stage v90. The content control unit 503 may also generate the virtual object v41b as the display information visualizing the other user manipulating the corresponding top v60.

The content control unit 503 may generate the virtual objects v45 and v47 serving as the guidance depending on the progress state of the game. The content control unit 503 may be configured to generate the virtual object v43 serving as the guide when the game is started, and to maintain the state of displaying the virtual object v43 while the game is continued. Note that the virtual objects v43, v45, and v47 may be generated and controlled in the same manner as by the content control unit 303 according to the second embodiment.

The content control unit 503 outputs, to the display control unit 504, each captured image, information indicating the position and the orientation of the information processing apparatus 50 in the virtual space, and the control information of the corresponding virtual object, which are sequentially acquired. Note that the control information includes: the display information for displaying each virtual object as an image in the captured image; and the information indicating the position and the orientation of the virtual object in the virtual space.

The display control unit 504 acquires, from the content control unit 503, the captured image, the information indicating the position and the orientation of the information processing apparatus 50 in the virtual space, and the control information of the virtual objects. The display control unit 504 identifies the relative positions between the information processing apparatus 50 and each virtual object, based on the information indicating the position and the orientation of the information processing apparatus 50 in the virtual space and the control information of the virtual objects. The display control unit 504 identifies the position and the orientation of the virtual object in the captured image based on the corresponding identified relative position, and displays the virtual object in the superimposed manner in the captured image, based on the identified position and the orientation. The display control unit 504 displays the captured image including the virtual object displayed in the superimposed manner on the display unit 509.

Note that the content control unit 503 sequentially recognizes the motion state of each top v60. Accordingly, the content control unit 503 may generate the corresponding virtual object as the display information visualizing the motion state (for example, the rotational speed, the translation speed, or the motion direction) of the top v60.

Note that the information processing apparatuses 50 may each calculate the position and the orientation of each top v60 in the virtual space and the position and the orientation of the stage v90, and may then transmit and receive the calculated information to and from each other. In another example, one of the plurality of information processing apparatuses 50 may calculate the relative positional relationships among the information processing apparatus 50, the tops v60, and the stage v90 and may then control the movement of the tops v60. In still another example, a server may be provided separately from the information processing apparatuses 50, may calculate the relative positional relationships among the information processing apparatuses 50, the tops v60, and the stage v90 based on each captured image notified from each information processing apparatus 50, and may then control the movement of the tops v60. Note that the information processing apparatuses according to the first and the second embodiments may be configured as described above. In other words, in the first embodiment, the processing related to the calculation of the position and the motion state of each real object may be executed by the plurality of information processing terminals in cooperation with each other, or by any of the information processing terminals or the server. In the second embodiment, the movement of each real object may be controlled by the plurality of information processing terminals in cooperation with each other, or by any of the information processing terminals or the server.

Figure 20:
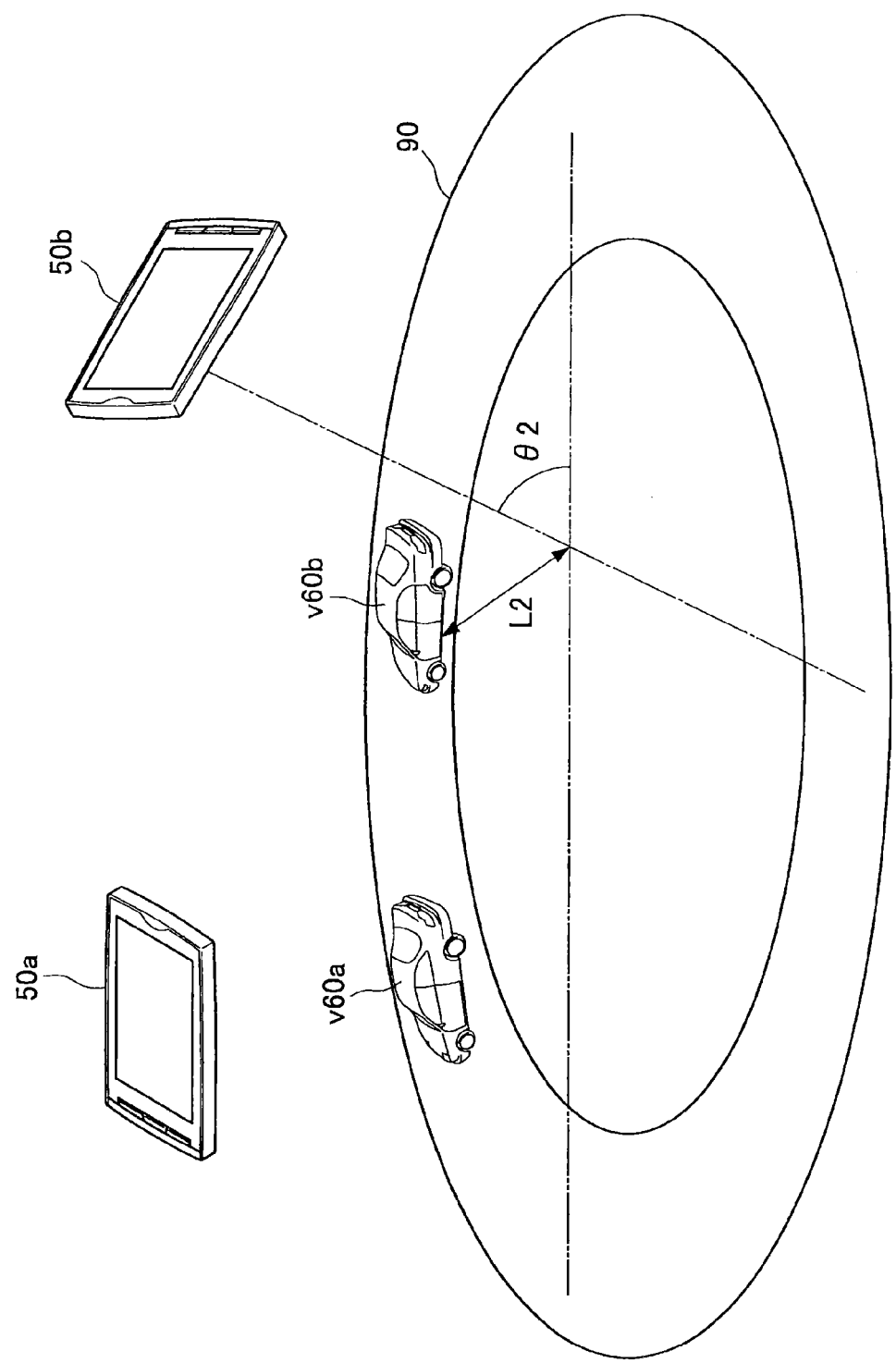
FIG. 20 is a diagram for explaining another mode of the information processing apparatus according to the embodiment.

Note that the description has been given by taking the top spinning game as an example, but the control of the movement of the virtual object v60 is not limited to the aforementioned example as long as the movement of the control-target virtual object v60 can be controlled based on the relative position between at least two of the information processing apparatus 50, the control-target virtual object v60, and the stage v90. For example, FIG. 20 is a diagram for explaining another mode of the information processing apparatus 50 according to the present embodiment and illustrates a case where the information processing apparatus 50 is applied to a race game. In this case, the information processing apparatus 50 may calculate the distance L2 from the optical axis of the imaging unit 501 and the angle of elevation θ2 on the assumption that the virtual objects v60 and the stage v90 are vehicle bodies and a course, respectively, and may control movement of the corresponding vehicle body v60 based on calculation results.

Figure 21:
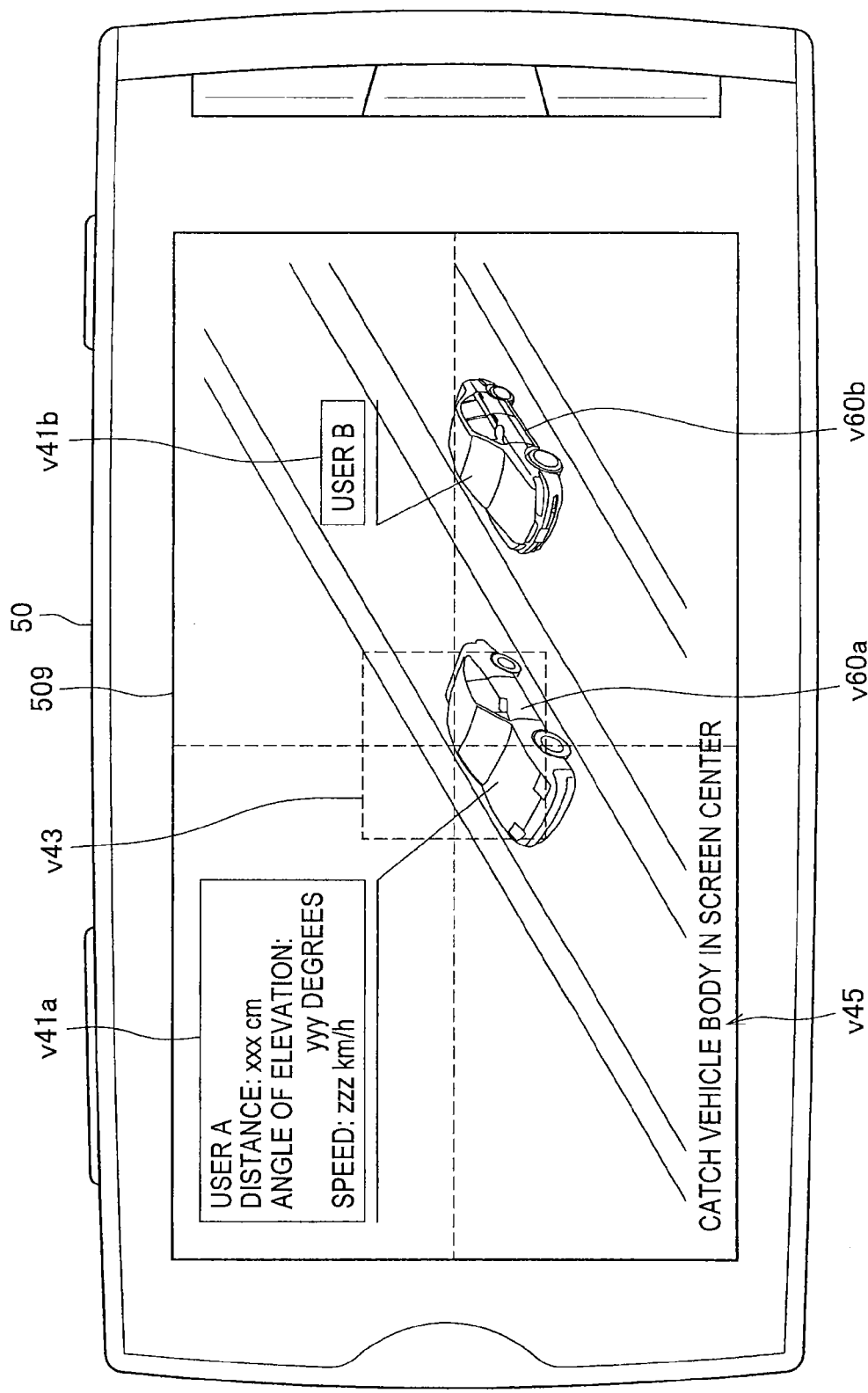
FIG. 21 is a diagram illustrating an example of a screen of the information processing apparatus according to the embodiment in still another mode.

Here, reference is made to FIG. 21. FIG. 21 is a diagram illustrating an example of a screen of the information processing apparatus according to the embodiment in another mode, and illustrates an example of a screen for manipulating the race game illustrated in FIG. 20. In this case, the information processing apparatus 50 may display: a virtual object v41a as display information visualizing the distance L2 between the optical axis of the imaging unit 501 and the vehicle body v60 which is to be a control target; and the angle of elevation θ2 of the optical axis of the imaging unit 501 with the stage v90. The information processing apparatus 50 may also display a virtual object v41b as display information visualizing the user of the corresponding vehicle body v60 other than the control-target vehicle body v60.

Like the example of the top spinning game illustrated in FIG. 18, the virtual objects v45 and v47 serving as the guidance and the virtual object v43 serving as the guide may be displayed in the superimposed manner in the captured image.

The information processing apparatus 50 according to the third embodiment may be combined with the information processing apparatuses according to the first and the second embodiments. In a specific example of applying the information processing apparatus 50 to the top spinning game, each information processing terminal may use a real object top as a control target at the beginning of the game, and may then use a virtual object after the real object top stops. In this case, the information processing apparatus may control the movement of the real and virtual object tops according to a relative position between the real object top and the virtual object. When displaying life points of characters, for example, as illustrated in FIG. 2, the information processing apparatus may also stage displaying by allocating life points to both the real object and the virtual object (for example, by dividing the life points fifty-fifty).

3.3. Processing

Figure 22:
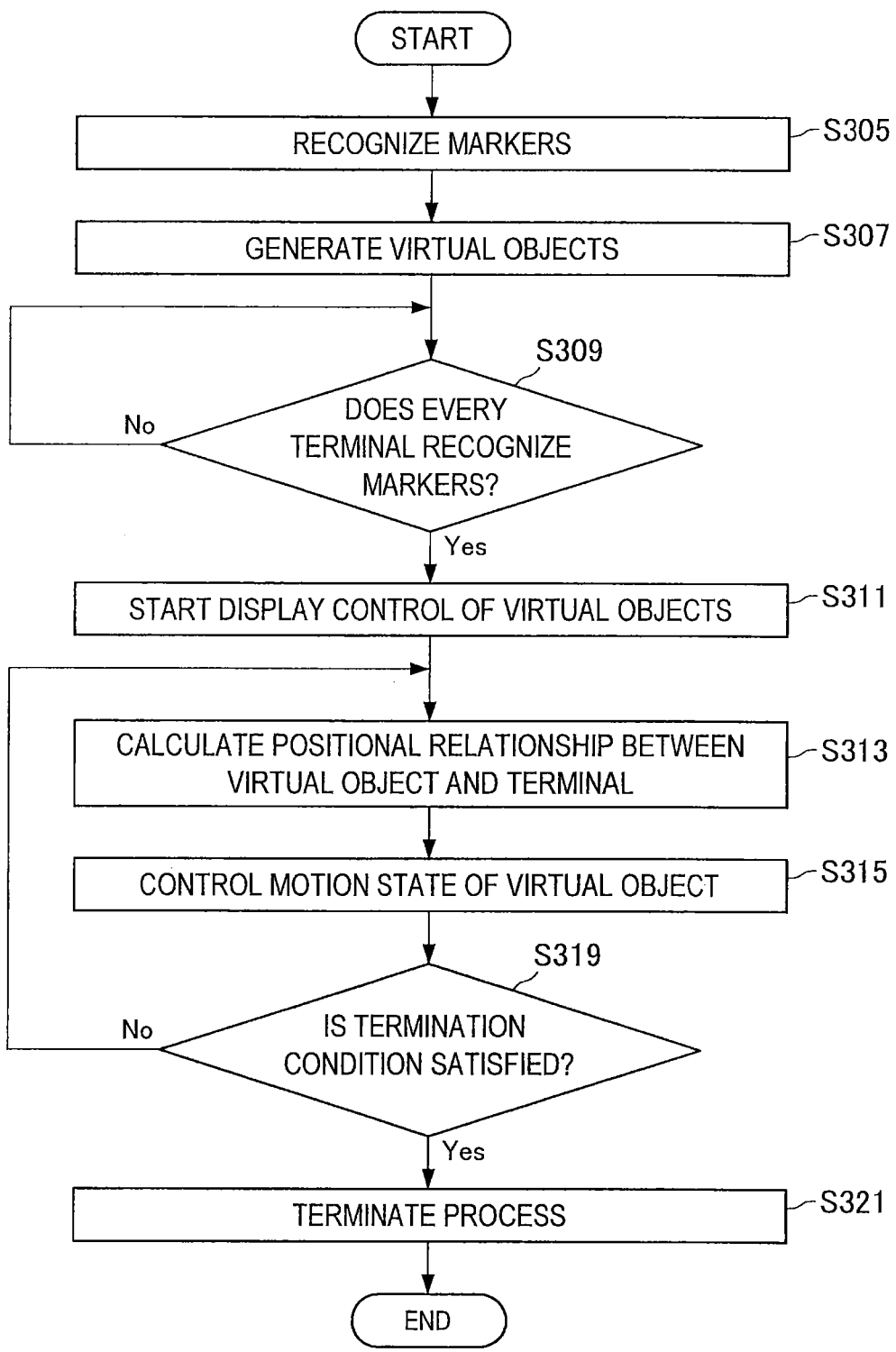
FIG. 22 is a flowchart illustrating an example of a series of operations of the information processing apparatus according to the embodiment.

A series of operations of the information processing apparatus according to the present embodiment will be described with reference to FIG. 22. FIG. 22 is a flowchart illustrating an example of the series of operations of the information processing apparatus according to the present embodiment.

(Step S305)

When each user captures markers based on which virtual objects are generated by using the corresponding information processing apparatus 50 including the imaging unit 501 and the display unit 509, the position calculation unit 502 detects the markers based on which the virtual objects are generated, in the captured image acquired from the imaging unit 501.

The position calculation unit 502 sequentially outputs, to the content control unit 503, the captured image acquired from the imaging unit 501 and position information indicating the position of each detected marker.

(Step S307)

The content control unit 503 sequentially acquires, from the position calculation unit 502, the image captured by the imaging unit 501, and the position information indicating the position of the detected marker.

The content control unit 503 identifies the position and the orientation of the information processing apparatus 50 with respect to the position of the marker in the virtual space, based on the position, the orientation, and the size of the marker in the acquired captured image.

In addition, the content control unit 503 generates the virtual object tops v60 for each information processing apparatus 50 manipulated by the corresponding user, and associates the tops v60 with the respective different information processing apparatuses 50. At this time, the content control unit 503 identifies one of the tops v60 which is to be a control target of the content control unit 503. The content control unit 503 also generates the stage v90 which is a virtual object.

(Step S309)

In this way, the information processing apparatuses 50 of the respective users recognize the markers based on which the virtual objects are generated (N in Step S309).

(Step S311)

After the information processing apparatus 50 of every user completes the recognition of the markers (Y in Step S309), the information processing apparatus 50 starts generating and controlling the virtual objects. Specifically, the content control unit 503 identifies positions of each generated top v60 and the stage v90 in the virtual space based on the positions of the markers. When receiving, for example, predetermined manipulation from the manipulation unit 505, the content control unit 503 starts motion of each generated top v60.

(Step S313)

For example, the content control unit 503 may calculate the distance L2 between the optical axis of the imaging unit 501 and the control-target top v60, based on: the position and the orientation of the information processing apparatus 50; and the position of the control-target top v60 in the virtual space.

The content control unit 503 may also calculate the angle of elevation θ2 of the optical axis of the imaging unit 501 with the stage v90, based on: the position and the orientation of the information processing apparatus 50 in the virtual space; and the position and the orientation of the stage v90. In addition, the information processing apparatus 50 may be provided with the gyro sensor, and thereby the content control unit 503 may calculate the angle of elevation θ2 of the optical axis of the imaging unit 501 based on a result of detection by the gyro sensor. In this case, the angle of elevation θ2 may be an angle of elevation with a horizontal plane in the real space.

(Step S315)

The content control unit 503 calculates the physical quantities (for example, the friction and the air resistance) for varying the motion state of the top v60 based on the relative positions among the information processing apparatus 50, the control-target top v60, and the stage v90.

In a specific example, the content control unit 503 may calculate the air resistance and the friction to be provided to the control-target top v60 based on the calculated distance L2 from the optical axis. The content control unit 503 may calculate the height of the center of gravity of the control-target top v60 based on the calculated angle of elevation θ2. The content control unit 503 may also calculate the variation of the rotational speed of the top v60 in accordance with the user manipulation through the manipulation unit 505. Note that the friction, the air resistance, and the variation of the rotational speed which are described above may be calculated in the same manner as in the information processing apparatus 30 according to the second embodiment.

The content control unit 503 varies the motion state of the corresponding top v60 based on the calculated physical quantities.

As described above, the content control unit 503 identifies the relative positions among the information processing apparatus 50, the tops v60, and the stage v90 in the virtual space, based on the captured image and the positional information of the marker sequentially acquired from the position calculation unit 502. Then, the content control unit 503 controls the movement of the corresponding top v60 based on the identified relative positions among the information processing apparatus 50, the tops v60, and the stage v90.

The content control unit 503 outputs, to the display control unit 504, the captured image, information indicating the position and the orientation of the information processing apparatus 50 in the virtual space, and the control information of the corresponding virtual object, which are sequentially acquired. Note that the control information includes: the display information for displaying each virtual object as an image in the captured image; and the information indicating the position and the orientation of the virtual object in the virtual space.

The display control unit 504 acquires, from the content control unit 503, the captured image, the information indicating the position and the orientation of the information processing apparatus 50 in the virtual space, and the control information of the virtual objects. The display control unit 504 identifies the relative positions between the information processing apparatus 50 and the virtual objects, based on the information indicating the position and the orientation of the information processing apparatus 50 in the virtual space and the control information of the virtual objects. The display control unit 504 identifies the position and the orientation of the virtual object in the captured image based on the corresponding identified relative position, and displays the virtual object in the superimposed manner in the captured image, based on the identified position and the orientation. The display control unit 504 displays the captured image including the virtual object displayed in the superimposed manner on the display unit 509.

(Step S319)

The content control unit 503 sequentially repeats: the identification of the relative positions among the information processing apparatus 50, the tops v60, and the stage v90; and the control of the movement of the top v60 which are described above until a predetermined condition for terminating the game is satisfied (N in Step S319).

(Step S321)

When the condition for terminating the game is satisfied (Y in Step S319), the generation and the control of the virtual object is stopped, and the series of processes are terminated.

3.4. Conclusion

As described above, the information processing apparatus 50 controls the movement of the corresponding top v60 according to the positional relationships among the information processing apparatus 50, the tops v60, the stage v90 in the virtual space. With such a configuration, each top 40 which is the real object is displayed as the corresponding virtual object v60, and thus the same game as in the second embodiment can be implemented without using the top 40 which is the real object.

4. Hardware Configuration Example

Figure 23:
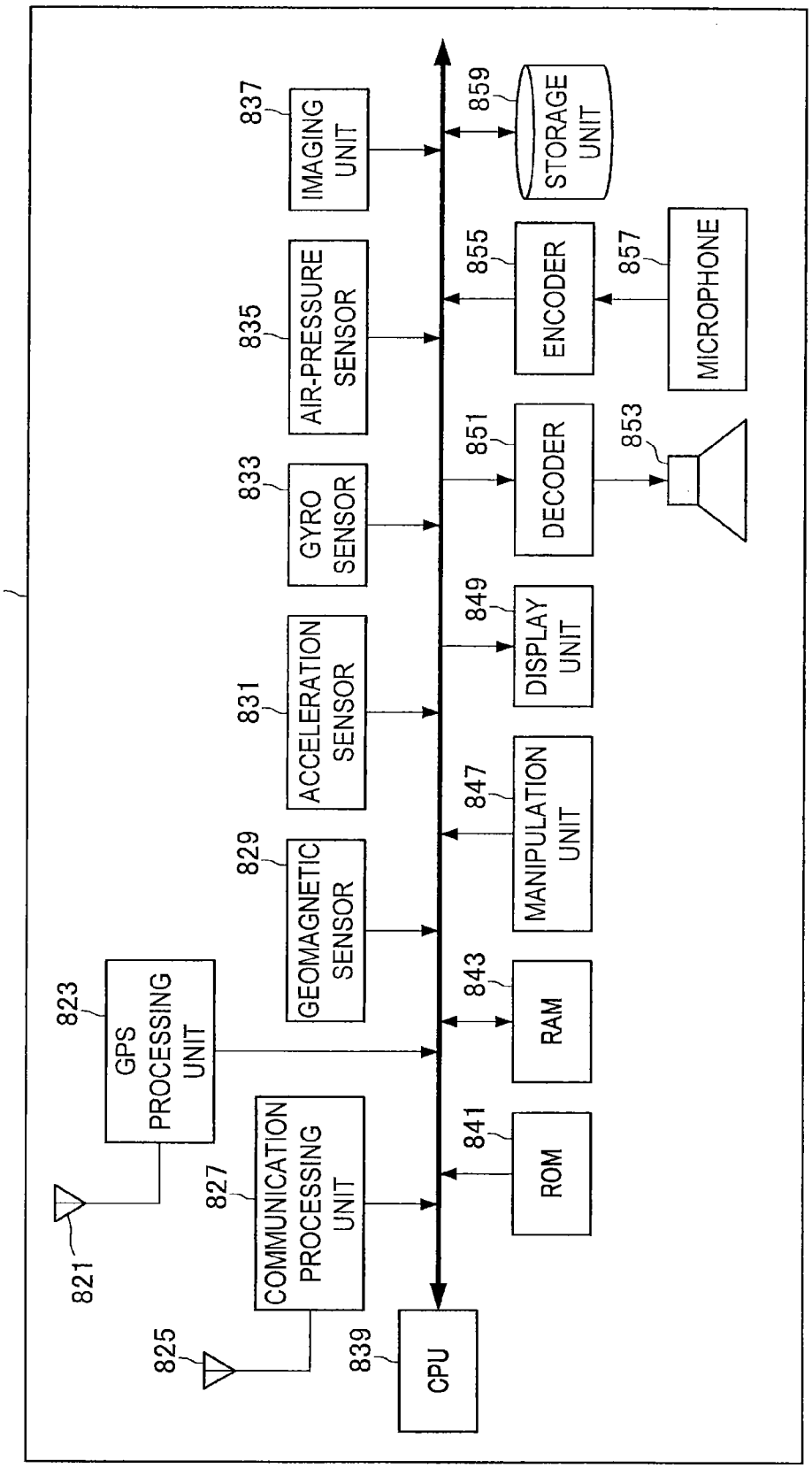
FIG. 23 is an explanatory diagram illustrating a hardware configuration example.

The information processing by the aforementioned information processing apparatuses 10, 30, and 50 according to the first to the third embodiments of the present disclosure is implemented when software cooperates with hardware of an information processing apparatus 800 which is to be described below and which is used as any of the information processing apparatus 10, 30, and 50. An example of the hardware configuration of the information processing apparatus 800 will be described with reference to FIG. 23. FIG. 23 is a block diagram illustrating the hardware configuration example of the information processing apparatus 800.

The information processing apparatus 800 includes, for example, a GPS antenna 821, a GPS processing unit 823, a communication antenna 825, a communication processing unit 827, a geomagnetic sensor 829, an acceleration sensor 831, a gyro sensor 833, an air-pressure sensor 835, an imaging unit 837, a CPU (Central Processing Unit) 839, a ROM (Read Only Memory) 841, a RAM (Random Access Memory) 843, a manipulation unit 847, a display unit 849, a decoder 851, a speaker 853, an encoder 855, a microphone 857, and a storage unit 859.

The GPS antenna 821 is an example of an antenna that receives a signal from a positioning satellite. The GPS antenna 821 can receive GPS signals from a plurality of GPS satellites, and inputs the received GPS signals to the GPS processing unit 823.

The GPS processing unit 823 is an example of a calculation unit that calculates position information based on the signals received from the positioning satellites. The GPS processing unit 823 calculates information indicating a current position based on the plurality of GPS signals inputted from the GPS antenna 821, and outputs the calculated position information. Specifically, the GPS processing unit 823 calculates the position of each GPS satellite from orbit data of the GPS satellite, and calculates a distance from the GPS satellite to the information processing apparatus based on a differential time between a transmission time of the GPS signal and a reception time thereof. The GPS processing unit 823 can calculate the current three-dimensional position based on the calculated position of each GPS satellite and a distance from the GPS satellite to the information processing apparatus. Note that the orbit data of the GPS satellite used here may be included, for example, in the GPS signal. Alternatively, the orbit data of the GPS satellite may be acquired from an external server through the communication antenna 825.

The communication antenna 825 is an antenna having a function of receiving communication signals, through for example, a mobile communication network or a wireless LAN (Local Area Network) communication network. The communication antenna 825 can supply the communication processing unit 827 with the received signals.

The communication processing unit 827 has a function of performing various signal processes on the signals supplied from the communication antenna 825. The communication processing unit 827 can supply the CPU 839 with digital signals generated from the analog signals supplied from the communication antenna 825.

The geomagnetic sensor 829 is a sensor that detects geomagnetism as a voltage value. The geomagnetic sensor 829 may be a triaxial geomagnetic sensor that detects geomagnetism in directions of an X-axis, a Y-axis, and a Z-axis. The geomagnetic sensor 829 can supply the CPU 839 with the detected geomagnetic data.

The acceleration sensor 831 is a sensor that detects acceleration as a voltage value. The acceleration sensor 831 may be a triaxial acceleration sensor that detects acceleration in the directions of the X-axis, the Y-axis, and the Z-axis. The acceleration sensor 831 can supply the CPU 839 with the detected acceleration data.

The gyro sensor 833 may be a sort of an instrument that detects an angle or an angular velocity of an object, and may be a triaxial gyro sensor that detects, as a voltage value, velocity (angular velocity) of change of a rotation angle around each of the Y-axis and the Z-axis. The gyro sensor 833 can supply the CPU 839 with angular velocity data.

The air-pressure sensor 835 is a sensor that detects an ambient air pressure as a voltage value. The air-pressure sensor 835 can detect the air pressure at predetermine sampling frequencies and supply the CPU 839 with the detected air pressure data.

The imaging unit 837 has a function of capturing still images or moving images through a lens under control of the CPU 839. The imaging unit 837 may store the captured images in the storage unit 859.

The CPU 839 functions as an arithmetic processing unit and a controller device and controls overall operations of the information processing apparatus 800 according to programs. The CPU 839 may be a microprocessor, and can implement various functions according to the various programs.

The ROM 841 can store therein the programs, operational parameters, and the like which are used by the CPU 839. The RAM 843 can temporarily store the programs used in executing the CPU 839, parameters appropriately varying in executing the programs, and the like.

The manipulation unit 847 has a function of generating input signals for the user to perform predetermined manipulation. The manipulation unit 847 may include: an input unit, such as a touch sensor, a mouse, a keyboard, buttons, a microphone, a switch, or a handle, which is provided for the user to input information; and an input control circuit or the like that generates an input signal based on input from the user and outputs the signal to the CPU 839.

The display unit 849 is an example of an output device, and may be a display device such as an LCD (Liquid Crystal Display) device, an OLED (Organic Light Emitting Diode) display device, or the like. The display unit 849 can provide the user with information by displaying a screen.

The decoder 851 has a function of performing decoding, analog conversion, and the like on inputted data under the control of the CPU 839. The decoder 851 performs the decoding, the analog conversion, and the like on audio data inputted through, for example, the communication antenna 825 and the communication processing unit 827, and outputs the audio signal to the speaker 853. The speaker 853 can output audio based on the audio signal supplied from the decoder 851.

The encoder 855 has a function of performing digital conversion, encoding, and the like on the inputted data under the control of the CPU 839. The encoder 855 can perform the digital conversion, the encoding, and the like on an audio signal inputted from the microphone 857 and outputs audio data. The microphone 857 can collect audio and output the audio as the audio signal.

The storage unit 859 is a device for data storage and can include: a storage medium; a recording device that records data in the storage medium; a reader device that reads data from the storage medium; deletion device that deletes data recorded in the storage medium; and the like. Here, the following may be used as the storage medium: a non-volatile memory such as a flash memory, MRAM (Magnetoresistive Random Access Memory), an FeRAM (Ferroelectric Random Access Memory), a PRAM (Phase change Random Access Memory), and an EEPROM (Electronically Erasable and Programmable Read Only Memory); a magnetic recording medium such as a HDD (Hard Disk Drive); or the like.

For example, the aforementioned display unit may be a HMD (Head Mount Display). For example, when a non-see-through HMD is used as a display unit, the captured image does not necessarily have to be displayed on the display unit. In this case, the display unit may superimpose virtual objects on an image of the real space, instead of the captured image.

It is also possible to generate a program for causing the hardware including the CPU, the ROM, the RAM, and the like built in a computer to exert functions equivalent to those in the configuration of the aforementioned information processing apparatus. It is also possible to provide a computer-readable storage medium having the program recorded therein.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
an acquisition unit configured to acquire a motion state of a real object; and
a display control unit configured to display a virtual object according to the acquired motion state.

(2) The information processing apparatus according to (1),
wherein the acquisition unit acquires the motion state based on an image captured by an imaging unit.

(3) The information processing apparatus according to (1),
wherein the acquisition unit acquires the motion state based on sensor data detected by a sensor.

(4) The information processing apparatus according to (3),
wherein the sensor is provided to the real object.

(5) The information processing apparatus according to any one of (1) to (4), further including:
a movement control unit configured to vary the motion state of the real object according to a relative positional relationship between the imaging unit and the real object.

(6) The information processing apparatus according to (5),
wherein the movement control unit varies the motion state in accordance with a distance between an optical axis of the imaging unit and the real object.

(7) The information processing apparatus according to (5),
wherein the movement control unit varies the motion state according to a relative positional relationship between a reference for displaying the virtual object and the imaging unit.

(8) The information processing apparatus according to any one of (1) to (7),
wherein the display control unit infers change in the acquired motion state based on the motion state and displays the virtual object based on an inference result.

(9) The information processing apparatus according to any one of (1) to (7),
wherein the display control unit infers change in a position of the real object based on the acquired motion state and displays the virtual object based on an inference result.

(10) The information processing apparatus according to any one of (1) to (9),
wherein the acquisition unit acquires motion states of a plurality of the real objects, and
wherein the display control unit displays the virtual objects according to the acquired motion states of the plurality of real objects.

(11) The information processing apparatus according to (10),
wherein the display control unit infers relative positional relationships of the plurality of real objects according to the acquired motion states of the plurality of real objects, and displays the virtual objects based on inference results.

(12) The information processing apparatus according to any one of (1) to (11),
wherein the acquisition unit acquires a variation of motion of the real object as the motion state.

(13) The information processing apparatus according to any one of (1) to (11),
wherein the acquisition unit acquires a variation in a motion direction of the real object, as the motion state.

(14) The information processing apparatus according to any one of (1) to (13), wherein the display control unit displays the virtual object relative to a reference recognized from an image captured by the imaging unit.

(15) An information processing method including:
acquiring a motion state of a real object; and
displaying a virtual object according to the acquired motion state.

(16) A non-transitory computer-readable storage medium having a program stored therein, the program causing a computer to execute:
acquiring a motion state of a real object; and
displaying a virtual object according to the acquired motion state.

What is claimed is:

1. An information processing apparatus comprising:
circuitry configured to:
acquire a motion state of a real object;
infer changes in a position of the real object based on the acquired motion state;
display a virtual object according to the inference; and
vary the motion state in accordance with a distance between an optical axis of the information processing apparatus and the real object.

2. The information processing apparatus according to claim 1,
wherein the circuitry acquire the motion state based on an image captured by the information processing apparatus.

3. The information processing apparatus according to claim 1,
wherein the circuitry acquire the motion state based on sensor data detected by a sensor.

4. The information processing apparatus according to claim 3,
wherein the sensor is provided to the real object.

5. The information processing apparatus according to claim 1,
wherein the circuitry is further configured to infer change in the acquired motion state based on the motion state and displays the virtual object based on an inference result.

6. The information processing apparatus according to claim 1,
wherein the circuitry is further configured to acquire motion states of a plurality of the real objects, and
wherein the circuitry is further configured to display the virtual objects according to the acquired motion states of the plurality of real objects.

7. The information processing apparatus according to claim 6,
wherein the circuitry is further configured to infer relative positional relationships of the plurality of real objects according to the acquired motion states of the plurality of real objects, and display the virtual objects based on inference results.

8. The information processing apparatus according to claim 1,
wherein the circuitry is further configured to acquire a variation of motion of the real object as the motion state.

9. The information processing apparatus according to claim 1,
wherein the circuitry is further configured to acquire a variation in a motion direction of the real object, as the motion state.

10. The information processing apparatus according to claim 1,
wherein the circuitry is further configured to display the virtual object relative to a reference recognized from an image captured by the information processing apparatus.

11. The information processing apparatus according to claim 1, wherein the real object is a target object being manipulated by a user and the virtual object is an object animating a condition of the target object.

12. An information processing method performed by an information processing apparatus, the method comprising:
acquiring a motion state of a real object;
inferring changes in a position of the real object based on the acquired motion state;
displaying a virtual object according to the inference; and
varying the motion state in accordance with a distance between an optical axis of the information processing apparatus and the real object.

13. An information processing apparatus comprising:
circuitry configured to:
acquire a motion state of a real object;
infer changes in a position of the real object based on the acquired motion state; and
display a virtual object according to the inference, wherein the real object is a target object being manipulated by a user and the virtual object is an object animating with expressions of being tired a condition of the target object, wherein the expressions indicate at least a decrease in a rotational speed of the target object.

14. The information processing apparatus according to claim 1, wherein the condition of the target object represents at least a change in a speed of the real object.

15. The information processing apparatus according to claim 13, wherein the real object is a top.

* * * * *